US00RE33835E

United States Patent [19]

Kime et al.

[11] E Patent Number: Re. 33,835

[45] Reissued Date of Patent: Mar. 3, 1992

[54] HYDRAULIC SYSTEM FOR USE WITH SNOW-ICE REMOVAL VEHICLES

[75] Inventors: James A. Kime, Columbus, Ohio; Gregory R. McMenamin, Troy, Mich.

[73] Assignee: H.Y.O., Inc., Columbus, Ohio

[21] Appl. No.: 605,559

[22] Filed: Oct. 29, 1990

Related U.S. Patent Documents

Reissue of:

[64] Patent No.: 4,089,833
Issued: Feb. 6, 1990
Appl. No.: 238,630
Filed: Aug. 30, 1988

[51] Int. Cl.[5] ..... E01C 19/20; B60P 1/16

[52] U.S. Cl. ..... 239/657; 239/663; 239/677; 239/684; 180/53.4; 298/22 C; 417/295; 91/31; 37/234

[58] Field of Search ..... 180/53.4; 239/657, 663, 239/670, 675, 677, 684; 298/22 C; 417/295, 310; 91/6, 19, 31; 37/234, 236, 117.5, DIG. 3, DIG. 7

[56] References Cited

U.S. PATENT DOCUMENTS

| | | | |
|---|---|---|---|
| 2,999,482 | 9/1961 | Bower | 91/31 |
| 3,003,262 | 10/1961 | Biasi | 298/22 C |
| 3,038,449 | 6/1962 | Murphy, Jr. et al. | 91/31 |
| 3,395,866 | 8/1968 | Sousek et al. | 239/670 |
| 3,549,120 | 12/1970 | Weiss | 239/675 |
| 3,776,431 | 12/1973 | Riley | 239/677 |
| 3,935,917 | 2/1976 | Eley et al. | 180/53.4 |
| 4,592,593 | 6/1986 | Channell | 298/22 J |
| 4,731,999 | 3/1988 | Niemiec | 417/295 |
| 4,741,675 | 5/1988 | Bowden | 417/295 |

FOREIGN PATENT DOCUMENTS

| | | | |
|---|---|---|---|
| 3446471 | 7/1986 | Fed. Rep. of Germany | 239/677 |

*Primary Examiner*—Andres Kashnikow
*Assistant Examiner*—Karen B. Merritt
*Attorney, Agent, or Firm*—Mueller and Smith

[57] ABSTRACT

A hydraulic system is provided including a hydraulic pump which is continuously coupled with the engine of a utility such as a dump truck utilized for snow-ice removal. When hydraulic implements employed on the truck are not actuated, the pump operates in a cavitation mode. During this cavitation mode of operation, there is no ingress of air through seals or the like to a venting of the gear pump chamber essentially to tank or atmosphere. A poppet valve is actuated in conjunction with periodic use of hydraulic elements on the truck to actuate the pump to an operational or pressurized mode. A key actuated calibrating system is employed to calibrate snow-ice removal components in a secure manner. Calibration is provided in conjunction with EEPROM memory.

25 Claims, 12 Drawing Sheets

CALIBRATE
700
732
D
702
704
IS CALIBRATE SWITCH SET
N
C
706
708
Y
710
IS STATUS SWITCH .=0
Y
CO
712
750
N
752
IS STATUS SWITCH = 1 & IS AUGER SW. =0
N
C2
754
800
Y
CI

CO
714
716
PUT PRESENT SPEED OF TRUCK AND "CAL MPH" INTO DISPLAY BUFFER
718
720
UPDATE DISPLAY
722
724
726
728
IS PLOW UP SWITCH DEPRESSED
Y
INCREMENT SPEED CALIBRATION CONSTANT
730
734
N
736
738
740
IS PLOW DN SWITCH DEPRESSED
Y
DECREMENT SPEED CALIBRATION CONSTANT
742
732
N
D

HYDRAULIC SYSTEM FOR USE WITH SNOW-ICE REMOVAL VEHICLES

Matter enclosed in heavy brackets [ ] appears in the original patent but forms no part of this reissue specification; matter printed in italics indicates the additions made by reissue.

BACKGROUND OF THE INVENTION

Snow control vehicles as are used by governmental highway system authorities and the like as well as within private industry typically are provided as conventional dump trucks which are seasonally modified by the addition of snow-ice treatment components. Such components will include a forwardly-mounted plow which is controllable by hydraulic cylinders for up-down and right-left or angular movement. Upon the rearward end of the truck dump bed there usually is mounted sand-salt dispensing components which include a feed auger extending across the back edge of the dump bed. This auger is rotated by a hydraulic motor to effect movement of material from the bed onto a rotating spreader disk or "spinner" which functions to spread the sand-salt material onto the pavement being treated.

Thus, a hydraulic system for such vehicle is called upon to accommodate not only the dump body hoist but also the variable speed auger, the spinner, and plow control system. Because of the seasonal nature of snow-ice control, these latter function-dedicated components find duty only for a relatively minor portion of the operational life of a truck. Consequently, economic practicality dictates that the hydraulic system employed be as simple as possible while still providing adequate control performance. For example, permanently mounted hydraulic pumps preferably are not elaborate and thus remain "on line" or actively engaged by the truck motor during all periods of truck use, elaborate clutching schemes or the like not being practical from a cost standpoint. In view of their practical structuring, very often gear pumps are employed for the instant purpose. This continuous engagement of the hydraulic pump with the truck motor represents a design trade-off, the penalty for which is the expense of added energy consumption by the continuously coupled motor-pump assemblage.

Control features for the hydraulic systems are called upon to vary the rate of sand/salt distribution both with respect to weather conditions and to truck operation. For example, the speed of truck movement should be associated with the rate of material delivery to the pavement. Because variations in human factor aspects of truck operations can be anticipated, it also is desirable to both provide an automatic distribution control feature and a secure distribution parameter selection for management control regulation of rates of salt/sand distribution. In the latter regard, ecological considerations may enter into the allowable amounts of deposition of chemicals such as salt.

SUMMARY

The present invention is directed to an improved hydraulic circuit and to a hydraulic pump associated therewith suited for dump trucks and particularly with respect to such trucks when outfitted with hydraulically driven components utilized for snow-ice control and the like. The hydraulic pump is of a pump gear type which incorporates a suction side shut-off valve permitting its performance in a cavitation mode significantly lowering torque loads on the truck motor during periods of hydraulic system non-use. Air ingress into the pump cavity during cavitation mode performance is avoided through a unique venting configuration. In a preferred embodiment, a poppet type valve is used for select pump suction side shut-off which is actuated to a performance or fluid pressurizing mode of operation utilizing a valve coupling of the suction input of the pump.

The hydraulic circuit includes a valving arrangement for "jogging" the downward movement of the dump bed of a truck to enhance operator control over dumping procedures. The latter feature is particularly useful for such highway repairs as patchwork and the like.

Where the dump truck with which the hydraulic circuit and pump are incorporated is employed for snow-ice control procedures, it typically will be provided with a rear mounted auger and a spinner for sand-/salt distribution. The hydraulic circuit employs solenoid actuated valves to control fluid motors associated with the distribution items. Control over the solenoid actuated valves is effected by a microprocessor driven control circuit which is operated from the cab of the truck. To facilitate the management of snow-ice control, the calibration of the distributing auger assembly and the determination of distribution rates with respect to truck speed are provided in conjunction with a key actuated enabling switch such that alteration to application rates cannot be made by unauthorized personnel.

A feature of the invention is to provide, in a utility vehicle of the type having an internal combustion engine and hydraulically-driven implements operated, when selectively actuated, with pressurized hydraulic fluid derived from a pump driven by the engine, the improved hydraulic pump which includes a pump housing mounted upon the vehicle and having a pump chamber. First and second pump gears are mounted for rotation within the housing pump chamber and define a pump suction side and a pump pressure side connectable with the implements. A connector arrangement provides for connecting the first pump gear in continuous driven relationship with the truck engine and a suction port provides for coupling the pump suction side with a hydraulic fluid reservoir which is retained at substantially atmospheric pressure. A poppet valve is coupled intermediate the suction port and the pump suction side and is actuable to have a closed orientation substantially blocking passage of hydraulic fluid into the pump suction side to derive a cavitation mode of pump operation and is actuable to have an open orientation permitting the flow of hydraulic fluid from the reservoir into the pump suction side to derive a fluid pressurizing mode of operation said poppet valve including a poppet slidably movable between open and closed orientations within a valve chamber. A vent is provided for venting the pump chamber substantially to atmospheric pressure to avoid ingress of air thereinto during the cavitation mode of pump operation and an actuator provides for selectively actuating the poppet valve into the open orientation by coupling one end of the valve chamber with the pump suction side, and into the closed orientation by terminating the coupling with the suction side to permit movement of the poppet to its closed orientation.

Another feature of the invention provides, in a truck of a variety having an internal combustion engine serving as a prime mover, a hydraulic pump driven by the engine, a dump bed and a hydraulic cylinder assembly including a rod and piston reciprocably movable within a cylinder chamber between first and second positions for selectively elevating and lowering the dump bed, the improved hydraulic control system which includes a hydraulic distribution network including a pressure line extending from the pump, a suction line extending from the pump, and a reservoir substantially at atmospheric pressure communicating with the suction line. A first hydraulic valve arrangement is hydraulically actuable to apply hydraulic fluid from the pressure line to the cylinder chamber at the first position and simultaneously fluid communicate the reservoir with the chamber second position to effect bed elevation. A second hydraulic valve arrangement hydraulically actuable to apply hydraulic fluid from the pressure line to the cylinder chamber at the second position is provided and this valve arrangement simultaneously fluid communicates the reservoir with the chamber first position to effect bed lowering. A third hydraulic valve arrangement is hydraulically actuable to communicate the reservoir with the chamber first position to effect a rapid bed lowering movement. A first switch controlled actuator is provided for actuating the first hydraulic valve arrangement and a second switch controlled actuator is provided for actuating the second hydraulic valve, while a third switch control actuator provides for actuating the third hydraulic valve. A control arrangement is controllably coupled with the first, second, and third switch controlled actuators and includes a first switch manually actuable for controlling the first and second switch controlled actuator means and a second switch manually actuable for controlling the third switch controlled actuator for effecting a rapid lowering movement of the bed of short duration.

Another feature of the invention is the provision, in a truck of a variety suited for snow-ice control, wherein a wheel mounted frame supports an internal combustion engine, a cab and a hydraulic cylinder driven dump bed, and including an auger mounted rearwardly of the bed having a hydraulic auger motor and a hydraulic motor-driven spinner for receiving materials deposited thereon at predetermined rates by said auger, a hydraulic pump connected in driven relationship with the engine for powering the auger and spinner hydraulic motors and the hydraulic cylinder, an improved control system which comprises a solenoid actuated valve arrangement selectively actuable for controlling the speed of the auger motor. Additionally provided is a speed transducer having a speed output which when multiplied by a speed calibration constant derives a product signal representing truck speed and an electrically erasable memory is provided for retaining the speed calibration constants, auger volume constants and auger flow rate constants. A control is provided which includes a calibration switch which is actuable under management limited access for deriving a calibration mode. A processor is included in the control for controllably affecting actuation of the solenoid actuated valve arrangement in correspondence with the speed product signal, the memory retained speed calibration constant, the auger volume constant, and the auger flow rate constants and is responsive to calibration switch actuation to enter the calibration mode to effect select alteration of the memory retained constant.

Other objects of the invention will, in part, be obvious and will, in part, appear hereinafter. The invention, accordingly, comprises the system and apparatus possessing the construction, combination of elements, and arrangement of parts which are exemplified in the following detailed disclosure and the scope of the invention is indicated in the appended claims.

For a fuller understanding of the nature and objects of the invention, reference should be had to the following detailed description taken in connection with the accompanying drawings.

DETAILED DESCRIPTION OF THE INVENTION

Figure 1:
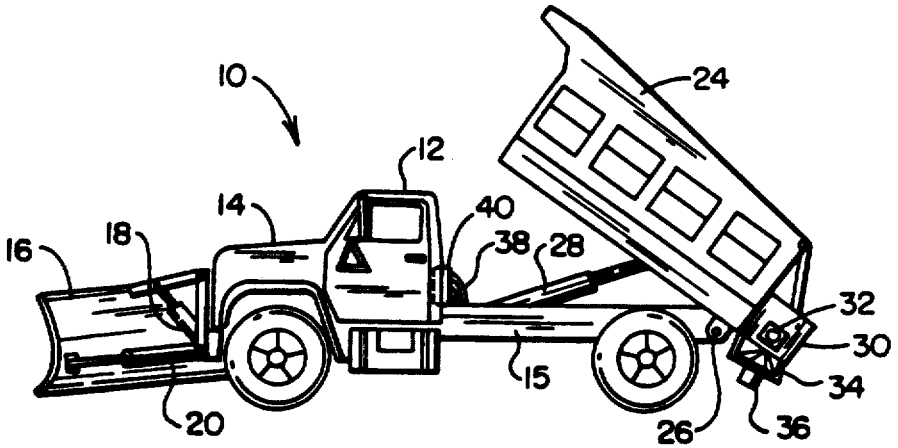
FIG. 1 is a side elevational view of a truck outfitted with typical implements for snow-ice control.

Referring to FIG. 1, a utility vehicle employed for the seasonal duties of snow-ice removal is revealed generally at 10. The dump truck 10 includes a cab 12 and hood 14 mounted upon a frame 15. At the forward end of the truck 10 there is mounted a snow plow 16 which is elevationally maneuvered by an up-down hydraulic cylinder assembly 18. Additionally, the plow 16 is laterally, angularly adjusted by left and right side hydraulic cylinder assemblies, the left side one of such assemblies being represented at 20. Truck 10 supports a dump bed 24 which is elevated about pivot connections at frame 15, one of which is shown at 26. This elevating action is carried out by actuation of a hydraulic cylinder assembly 28 which will be seen to further include an arrangement for "jogging" the elevational movement of the bed 24 permitting a limited rapid or fast down action to jog materials from the bed when it is used for conventional select material deposition and the like as may be occasioned with highway patching procedures.

Also seasonally attached to the dump body 24 of truck 10 is a material distributing auger represented generally at 30 which is rotated by a hydraulic motor 32. In similar fashion, a rotating disk spreading device or "spinner" is shown generally at 34. Spinner 34 distributes the sand and/or salt directed thereto by the auger 32 and, in this regard, is driven by another hydraulic motor 36. Hydraulic lines leading to the various hydraulic cylinders and motors are shown as an array thereof 38 which extend from a manifold 40, in turn, extending outwardly from electronic components within the protective environment of the cab 12.

To achieve a highest utility for trucks as at 10, during the majority of seasons, wherein snow-ice conditions are not expected, the plow 16, auger 30, and associated spinner 34 are removed and stored, thus freeing the truck 10 for practical utilization. However, during such intervals, it is economically mandated that the hydraulic pump providing hydraulic power to all of the above-noted implements remain in place, particularly, inasmuch as it is employed to carry out dump bed 24 lifting activity using cylinder 28. Additionally, even during months of weather wherein snow-ice conditions re contemplated, the amount of usage of the various hydraulically driven implements represents a relatively smaller percentage of overall truck 10 operations. Thus, should a hydraulic pump assembly be made available which minimizes the amount of energy extracted during non-hydraulic utilization while remaining of practical cost, significant savings can be realized in terms of fuel consumption reductions alone. The hydraulic pump assemblage described herein exhibits that desirable attribute.

Figure 2:
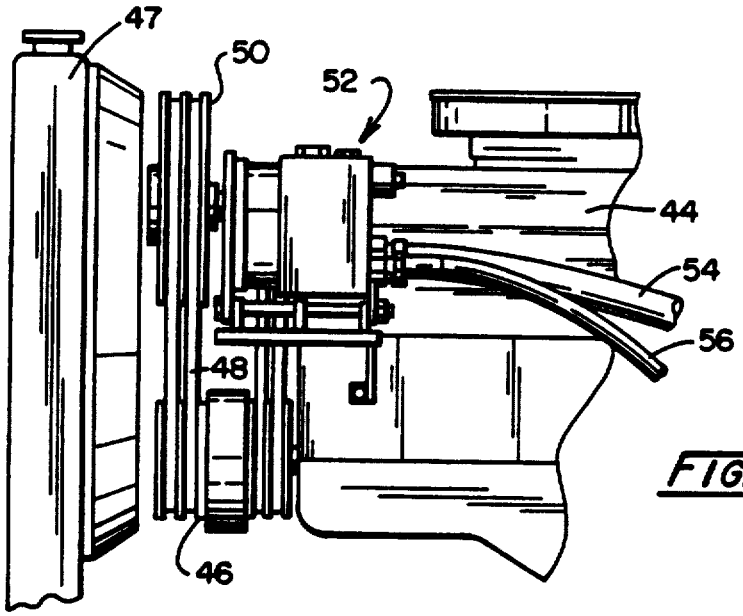
FIG. 2 is a partial side view of the engine of the truck of FIG. 1 showing the mounting of a hydraulic pump therewith according to the invention.

Looking to FIG. 2, a side view of the motor retaining portion of truck 10 beneath hood 14 is revealed. This region includes the motor 44 and associated radiator 47. One output of the motor 44 deriving from its crankshaft is provided at pulleys 46 which, in turn, are coupled by two V-belts 48 to pulleys 50 which, in turn, drive the input of a gear pump assemblage represented at 52. Gear pump assemblage 52 receives fluid from a relatively larger diameter suction line 54 which extends to a tank or reservoir at atmospheric pressure. Hydraulic fluid under pressure for implement actuation is provided at pressure line 56 from the pump assemblage 52.

Pump 52 functions in a demand mode in that when actuation at any of the hydraulic devices is called for, the pump automatically is enabled to provide an output of pressurized hydraulic fluid at line 56 which may be referred to as a fluid pressurizing mode of operation. On the other hand, when such hydraulic actuation activity is not called for, the pump automatically will have reverted to a stand-by form of driven actuation wherein only very minimal energy demands are made by it of the motor 44. This standby operation may be referred to as a cavitation mode. Pump 52 is of a gear pump variety and during this stand-by mode the gear pump components are operated in a cavitational mode wherein essentially no fluid is driven by the gear components of the pump. In effect, the torque load to the crankshaft of motor 44 with respect to the demands of pump 52 approaches a zero value. This stand-by cavitational mode of operation is developed essentially hydraulically, a suction shut-off valve being employed in conjuction with components which prevent the ingestion of atmospheric air through the seals of the pump and with an arrangement providing a lubricating source of oil to prevent thermal build-up and the like which might otherwise damage the components of the pump.

Figure 3:
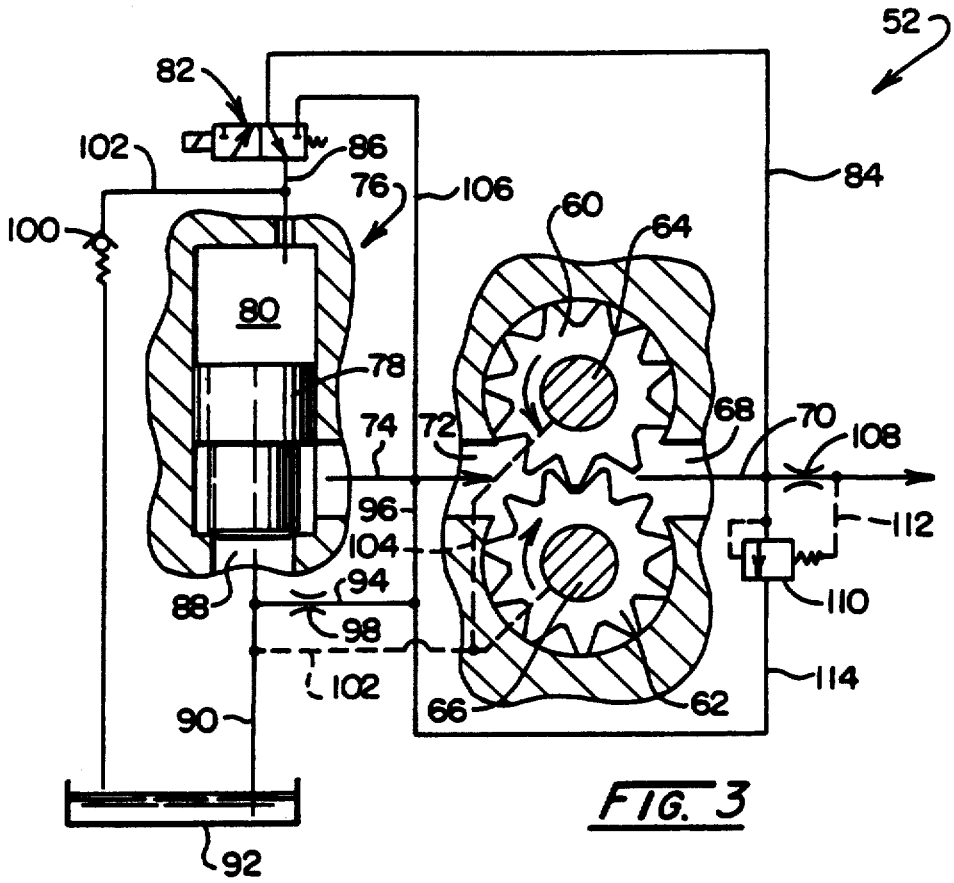
FIG. 3 is a schematic representation of a hydraulic pump according to the invention.

Looking to FIG. 3, a schematic depiction of the cavitational mode developing components is revealed. In the figure, a pump assemblage 52 is shown to have two intermeshed pump gears 60 and 62 within a pump chamber, gear 60 being driven from the crankshaft of an associated motor through shaft 64, while gear 62 being mounted for rotation within the pump 52 upon shaft 66. The pressure side of pump 52 is represented at port 68 and schematically by line 70. Correspondingly, the suction input to the pump is represented at 72 and schematically by suction line 74. Control over the operation of pump 52 with respect to whether it is in a stand-by or operational mode is provided by a poppet valve assembly represented generally at 76 and shown to include a poppet 78 which is freely movable within valve chamber 80. Poppet 78 is shown positioned in an orientation closing off the suction input 74-72 of pump 52 to cause it to perform in a cavitational or stand-by mode. This orientation is, for the instant embodiment, developed by a solenoid actuated valve 82 which is shown in its unenergized state wherein a pressure line 84 connects pressure output 70 with the upper portion of the valve chamber 80 as represented by line 86. The opposite side of poppet 78 is shown closed against port 88 which is essentially at atmospheric pressure by virtue of its communication with the tank or reservoir as represented by line 90, the reservoir itself being represented at 92. The sealing force applied to poppet 78 for the closed orientation shown is primarily the pump vacuum exerted from input 74. To maintain lubrication of the gears 60 and 62 and control adverse thermal effects, a small amount of hydraulic fluid is permitted to enter the suction side of pump 52 as represented by lines 94 and 96 extending to suction input 74 and including a small diameter oriface 98 which serves to regulate fluid quantity to the noted minimal amount. Additionally communicating with tank or reservoir 92, is a check valve 100 shown extending within line 102 between line 86 and tank 92. This check valve 100 permits hydraulic fluid from the discharge line 70 to be exhausted back to the reservoir 92 during a cavitational mode of operation of pump 52. The valve 100 provides for the assertion of a small (i.e. 5 psi) pressure at line 86 to aid moving poppet 78 to a closed position particularly when the pump 52 is in other orientations than depicted wherein the force of gravity aids the movement of poppet 78. For example, an orientation upside-down with respect to that represented at FIGS. 3 or 4.

When operated in a cavitational mode with the poppet valve in the orientation shown and the suction side 74-72 of pump 52 closed, it has been found that air will ingress into the pump cavity rendering such operation unacceptable. However, this condition is corrected with the instant design. Generally, the air ingress occurs through the seal of the pump assembly in consequence of the vacuum otherwise generated during cavitational operations. Correction is provided by an atmospheric drain or vent for the cavity of the pump shaft assembly from the tank or reservoir 92 essentially at atmospheric pressure. This atmospheric vent or drain to the tank is represented in the figure by dashed lines 102 and 104.

When a hydraulic function of truck 10 is called for, then solenoid 82 is actuated such that suction line 106 is communicated through line 86 to the poppet cavity 80 to cause the poppet 78 to rise and open the suction port as represented at line 74. Pump 52 then provides a fluid pressure output as represented at line 70 which is controlled by an orifice 108 and is distributed as required into the hydraulic system of truck 10.

Inasmuch as the output at line 70 is of variable flow depending upon the rate of rotational input from the truck engine, a priority flow control is provided to regulate the maximum amount of flow available from the pump assembly. To provide this, a spring operated pressure sensing valve 110 monitors the output pressure at line 70 as represented at dashed line 112 and provides a feedback of excess flow via line 114 which essentially extends to the suction side of the pump or, in effect, to the tank. With such an arrangement, should hydraulic functions be implemented while the truck 10 is moving at a relatively higher speed, excessive reaction times for the function actuated will be controlled.

An electrically driven or solenoid actuated valve is provided at 82 inasmuch as the control over implements used in a snow-ice removal truck as at 10 is readily implemented electronically. Thus, a solenoid actuated device presents a logical technique of providing cavitation or stand-by modes and operational modes. However, it will be apparent that the hydraulic system itself can be monitored to achieve the same form of hydraulic actuation of the poppet valve 76.

Figure 4:
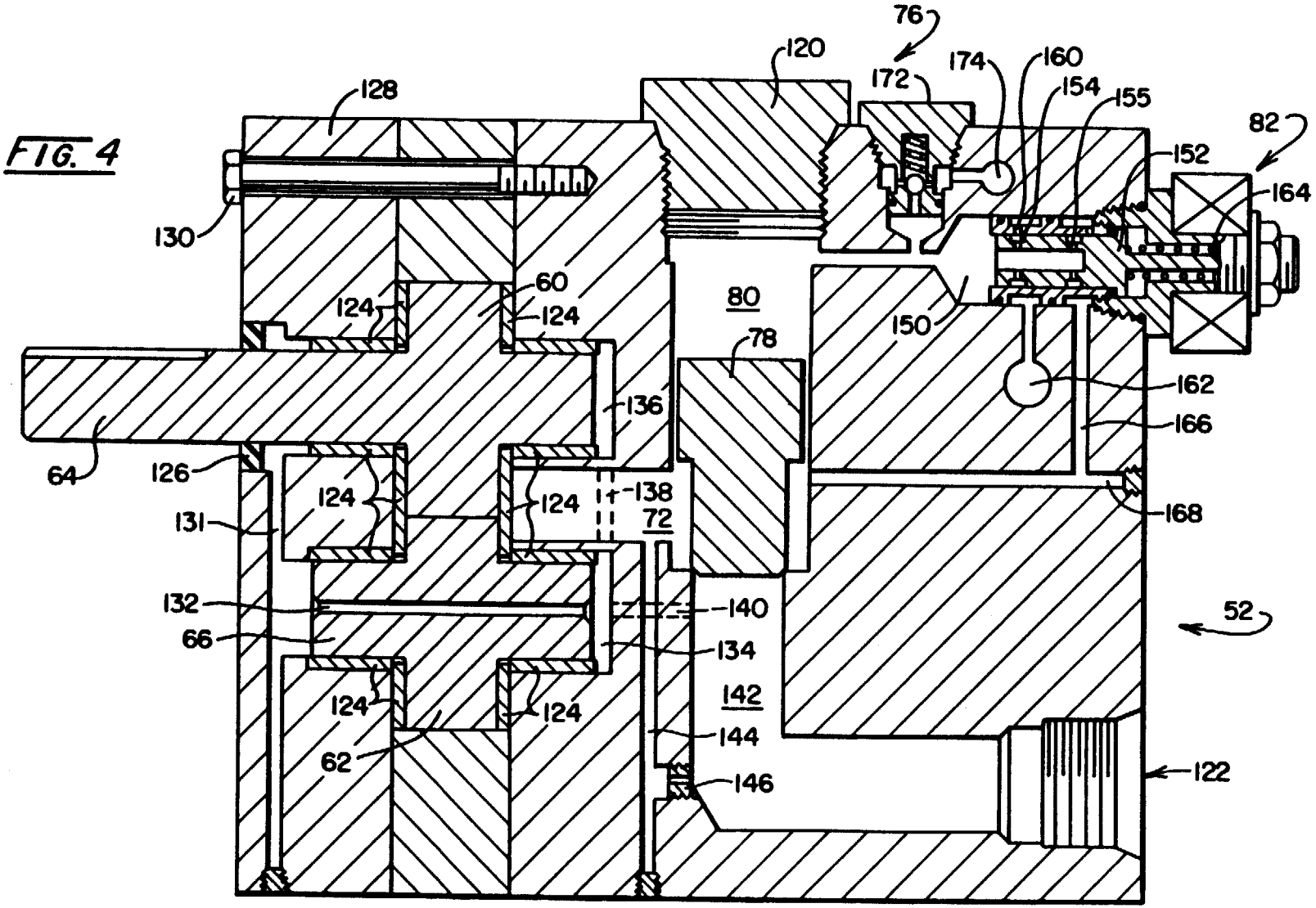
FIG. 4 is a sectional view of a hydraulic pump according to the invention.

Turning to FIG. 4, a sectional representation of the pump 52 is set forth. In the figure, gears 60 and 62 again are represented as well as shaft 64. The poppet 78 also is portrayed with the same numeration within cavity 80. Chamber 80 is seen to be capped by plug 120 and the suction inlet for the pump is represented at 122. Gears 60 and 62 are seen located within a gear cavity which further includes several bushings as at 124. The shaft 64 is shown extending through a seal 126 and the entire assemblage is seen to be located within a housing 128 assembled together by machine bolts, one of which is represented at 130.

The atmospheric drain to tank as represented in FIG. 3 by lines 102 and 104 is implemented in the embodiment of FIG. 4 by a combination of bores including bore 132 extending through the center or axle of gear 62 to open or communicate with a chamber 134 at the opposite side of gear 66. A chamber 131 is seen located at one side of gears 60 and 62 and adjacent seal 126. A chamber 136 adjacent gear 60 is communicated with chamber 134 by a duct or passage 138 and these two passages are shown in communication with the tank or reservoir by passage or duct 140 extending to the suction duct 142 leading to the suction port 122. Fluid inlet communication represented by line 94 and oriface 98 described in conjunction with FIG. 3 are seen in the instant embodiment to be provided by a bore 144 communicating with inlet port 72 and oriface 146 coupled between bore 144 and suction duct 142.

Solenoid 82 is shown coupled within chamber 150 extending to chamber 80 of the valve assembly 76. The valve includes a spring loaded shuttle or sliding cylinder 152 having passageways 154–155 extending in circumferential fashion about the shuttle 152. Passageway 154 is shown in communication with a passage 160 which, in turn, is in communication with a pressure port 162 to provide for the assertion of output fluid pressure on poppet 78 to cause it to assume the closed or cavitational mode or orientation represented in the figure. When solenoid valve 82 is actuated, the shuttle or sliding cylinder 152 is withdrawn against the bias of a spring 164 such that passageway 154 is blocked and passageway 155 is in communication with passageway 166 which extends via bore 168 to the suction port. This causes communication of the suction of the pump with chamber 80 to cause poppet 78 to move into the chamber and open the suction input.

A pressure relief valve (five pound spring check valve) is represented at 172 which will communicate with the reservoir or tank via duct 174 to exhaust fluid passing through orifice 146 to tank chamber 150. This valve corresponds with that described at 100 in FIG. 3.

Figure 5A:
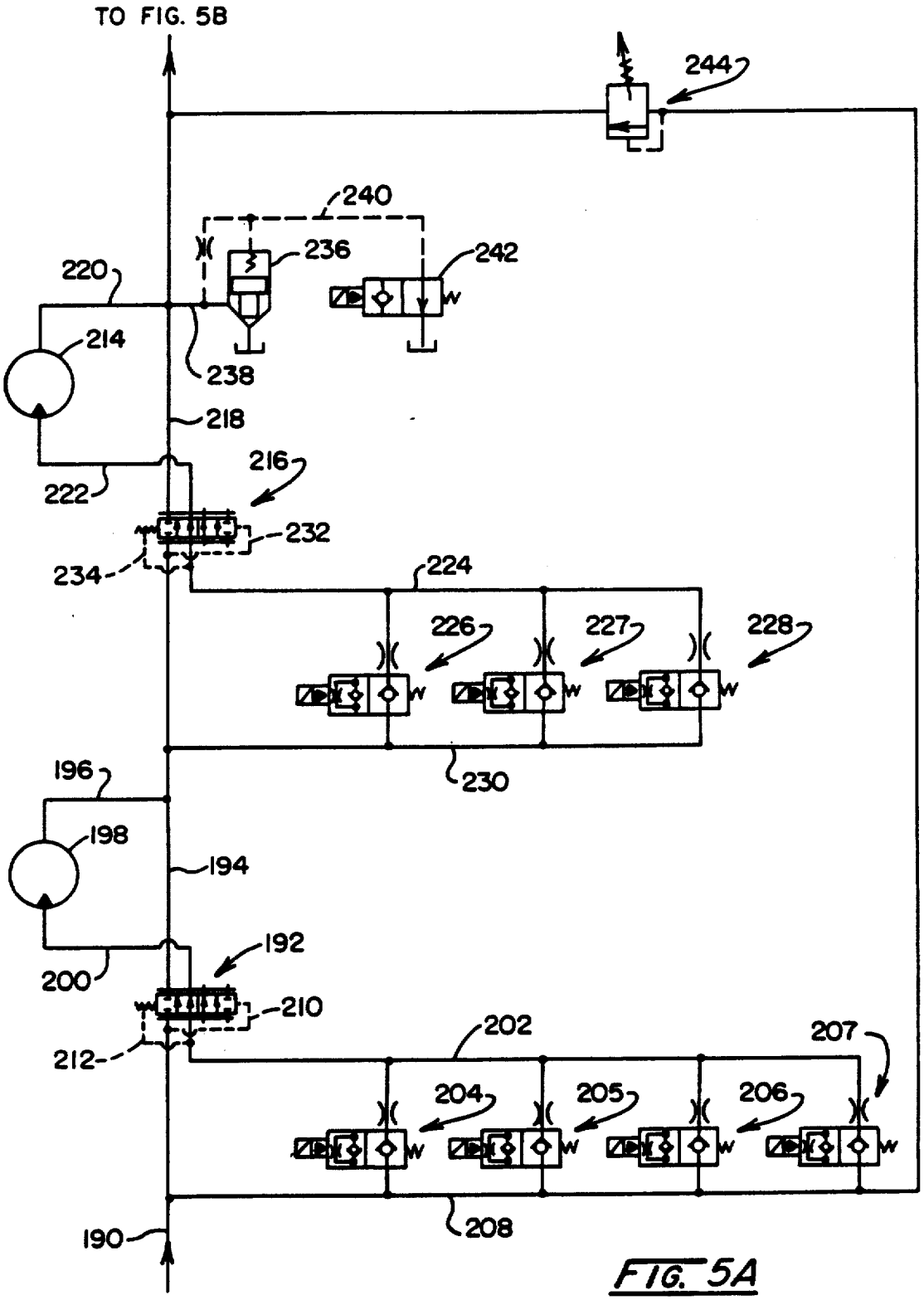
FIGS. 5A and 5B combine to provide a schematic hydraulic circuit diagram showing a hydraulic system employed with the invention.

The hydraulic circuit supply of pressurized fluid by the pump assembly 52 is configured in generally series fashion and is schematically illustrated in connection with FIGS. 5A and 5B which are mutually associated as represented by the labeling thereon. Looking to FIG. 5A, fluid flow from the pump 52 is shown entering at line 190, one portion selectively entering line 208 and the excess entering a hydraulically actuated by-pass valve 192. Valve 192 communicates with line 194 which, in turn, extends via line 196 to hydraulic motor 198. Motor 198 corresponds with the auger motor described in connection with FIG. 1 at 32. The opposite side of motor 198 is coupled via line 200 to valve 192. A line 202 is seen extending from valve 192 to a sequence of four solenoid actuated valves 204–207. The opposites sides of parallel connected valves 204–207 are seen coupled to line 208. Thus, actuation of one or more of the valves 204–207 effects driving fluid flow to motor 198. Valves 204–207 control the speed of motor 198 in a digital fashion, each having a binary designated flow rate. Thus, valve 204 may pass 1 GPM, valve 205 may pass 2 GPM, valve 206 may pass 4 GPM, and valve 207 may pass 8 GPM. By actuating the valve in different combinations, any flow rate in 1 GPM increments can be developed for driving the motor 198. In the absence of actuation of any valve 204–207, the resultant pressures as monitored at valve 192 as represented by dashed lines 210 and 212 effect a by-passing of the motor 198.

The next serially coupled functional implement is a hydraulic motor 214 corresponding with the spinner hydraulic motor 36 described in FIG. 1. In this regard, line 194 is seen to extend both to a hydraulically actuated by-pass valve 216 and to a line 230 to one side of a grouping of three speed controlling solenoid actuated valves 226–228. The opposite sides of valves 226–228 extend to line 224, in turn, extending a by-pass valve 216. The opposite side of valve 216 at line 222 extends to motor valve 214 which, in turn, is connected via line 220 to line 218 extending from valve 216. Thus line 218 carries all fluids combined at line 194. As before, the speed of motor 214 can be regulated in binary fashion by select actuation of valves within the grouping thereof 226–228. The activity of the latter valve grouping is monitored by pilot lines as represented at 232 and 234 to effect appropriate by-pass actuation of valve 216.

Line 218 can be dumped to tank via a pressure relief valve 236, the input to which is coupled to line 218 via line 238. Pressure at line 238 is monitored by pilot line 240 which functions to retain valve 236 in a closed orientation. Line 240, in turn, is further controlled by solenoid actuated valve 242 also connected to the tank. Thus, upon actuation of valve 242, normally open valve 236 is closed and, fluid flow is directed along line 218. A variable setting relief valve 244 provides controllable pressure relief for the system represented by FIG. 5A to avoid excessive pressure build-up.

Figure 5B:
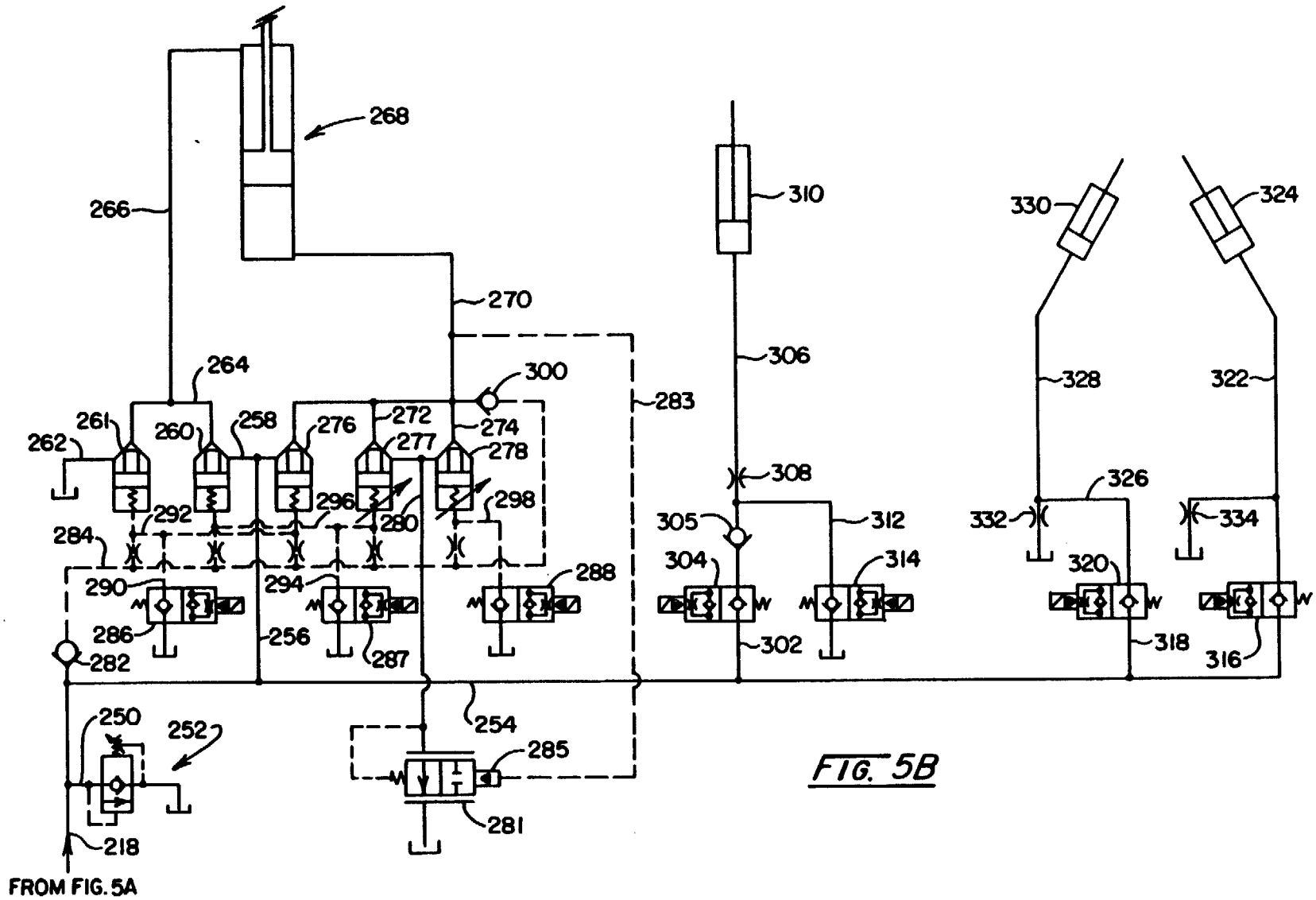

Turning to FIG. 5B, line 218 is seen extending to a connection at line 250 with a pressure relief valve 252. Valve 252 serves to dump hydraulic flow to tank or reservoir in the event of excessive pressure. Line 218 additionally is seen extending to line 254 which, in turn, is tapped by line 256 which extends to line 258 and valve 260 of the valve pair 260 and 261. Valve 261 is coupled to tank or reservoir via line 262 and each of the valves 260 and 261 are commonly coupled via lines 264 and 266 to the rod side of hydraulic cylinder 268. Cylinder assembly 268 corresponds with a hydraulic dump lift cylinder 28 described in conjunction with FIG. 1. The opposite side of cylinder 268 is coupled via lines 270, 272, and 274 to hydraulically actuated valves 276–278. Of this three-valve grouping, valves 277 and 278 are seen coupled, in turn, to tank or reservoir via line 280 and a pressure compensating valve (spool) 281 which senses the pressure at line 270 as at line 283 to proportionately restrict the line 280 to tank to assure a uniform rate of lowering of the dump bed 24. Valves 260–261 and 276–278 are normally held closed by fluid pressure asserted through check valves 282 and 300 and pilot line 284. This closed orientation, however, is altered with the select actuation of three solenoid actuated valves 286–288 which serve as switch controlled actuators. In this regard, valve 286 is seen connected between tank and the control inputs to valves 261 and 276 as represented at pilot lines 290 and 292. Thus, upon actuation of valve 286, valve 261 opens line 266 to tank and valve 276 opens to provide fluid under pressure to line 270. Correspondingly, valve 287 is seen coupled between tank and pilot lines 294 and 296. Line 296 is seen coupled in control relationship with valves 260 and 277. Accordingly, upon the actuation of valve 287, valve 260 is opened to provide application of fluid under pressure through line 266 and valve 277 is opened to vent line 270 to tank. Thus, the typical dump motion is controllably provided.

Solenoid actuated valve 288 provides the earlier-noted jogging function of the bed 24 to aid the operator in dumping limited quantities of material therefrom. In this regard, the valve 288 is coupled between tank and line 298 which, in turn, is connected to valve 278. By momentarily actuating the valve 288, valve 278, in turn, is opened to tank by effecting an opening of valve 281 as sensed at line 285 and flow creating a jogging or rapid downward movement of bed 24. Line 284 also is seen to extend to another check valve 300 which opens in the event pressure at line 284 is lower than that at line 270.

Line 254 additionally extends to line 302 extending to one side of solenoid actuated valve 304. The other side of valve 304 extends via line 306 incorporating check valve 305 and orifice 308 to hydraulic cylinder assembly 310 which corresponds with hydraulic cylinder 18 described in FIG. 1 as elevating the plow 16. Also coupled to line 306 via line 312 is a solenoid actuated valve 314, the opposite side of which is connected to tank. With the arrangement shown, the plow 16 is elevated by actuation of valve 304 and is, in turn, lowered by the actuation of valve 314.

Line 254 also extends to one side of solenoid actuated valve 316 and, through line 318, to one side of solenoid actuated valve 320. The opposite side of valve 316 extends via line 322 to hydraulic cylinder 324 representing the right side hydraulic cylinder assembly for moving plow 16 as described in FIG. 1. Similarly, the opposite side of valve 320 extends via lines 326 and 328 to hydraulic cylinder assembly 330 which corresponds with the left side plow actuating hydraulic cylinder as described at 20 in connection with FIG. 1. Line 326 is seen tapped by a small orifice 332 extending to tank and, similarly, line 322 is tapped by a similar orifice 334 extending to tank. With the arrangement shown, as one solenoid of the pair 316 and 320 is actuated, the other is not and the corresponding orifice associated therewith provides for directing fluid in the reversing cylinder of the tank.

Figure 6:
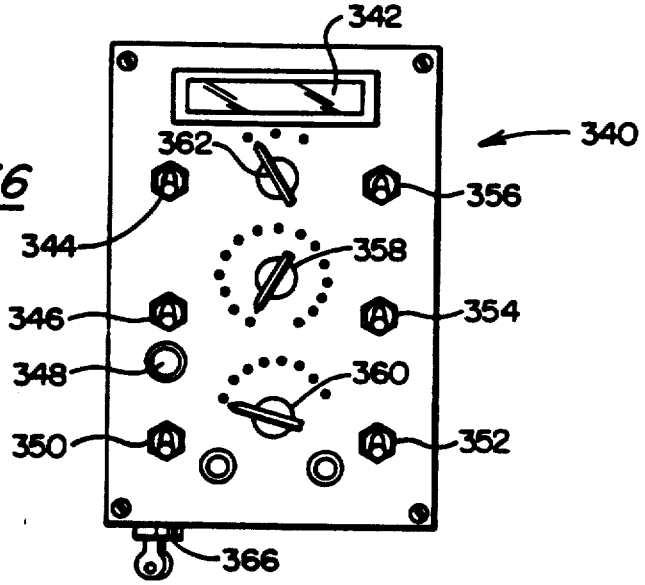
FIG. 6 is a front view of the panel of a control box incorporated within the cab of a vehicle incorporating the instant invention.

The hydraulic system thus described is readily operated on a convenient control box positioned, for example, within cab 12 of truck 10 as described in connection with FIG. 1. FIG. 6 shows such a control box 340 as including an LCD display 342 and a sequence of rotary switches, toggle switches, and button switches. In this regard, a toggle switch 344 provides conventional power on and off, while immediately therebelow a toggle switch 346 is actuated to move the dump bed 24 up and down. Button switch 348 functions to carry out the earlier-described jogging of bed 24 by effecting the actuation of solenoid actuated valve 288 as described in conjunction with FIG. 5B. A spring biased open button type switch facilitates the short duration switch actuation required for this function. Below button 348 is another toggle switch 350 which serves to selectively actuate solenoid actuated valves 304 and 314 to move the plow 16 up and down. The angular orientation of plow 16 is controlled by movement of a toggle switch 352 and a "blast" function is carried out by actuation of a switch 354. The latter function is one wherein, for example, the auger 30 is operated at maximum available RPM. Above switch 354, a toggle switch 356 serves a selection of an automatic or manual operation of the spreader function. Additionally, the switch has an orientation for turning off the spreader function. When the switch 356 is in an automatic orientation, the amount of salt and/or sand is distributed according to the speed of the truck and predetermined inserted data. When in a manual operational mode, the rate of material output is manually set by the operator by utilizing the zero to 15 position rotary switch 358 which provides auger speed control. In similar fashion, an eight-position switch 360 provides for selective rotational speed for the spinner 34.

A rotary switch 362 services a status switch which selects a display of miles per hour or pounds per mile depending upon its orientation.

An important feature of the control resides in the provision for inserting predetermined rates for deposition as selected at switch 358 in a secure fashion. For this purpose, a key actuated calibrate switch 366 is provided which may be employed by management to set the criteria for snow-ice control procedures.

Figure 7:
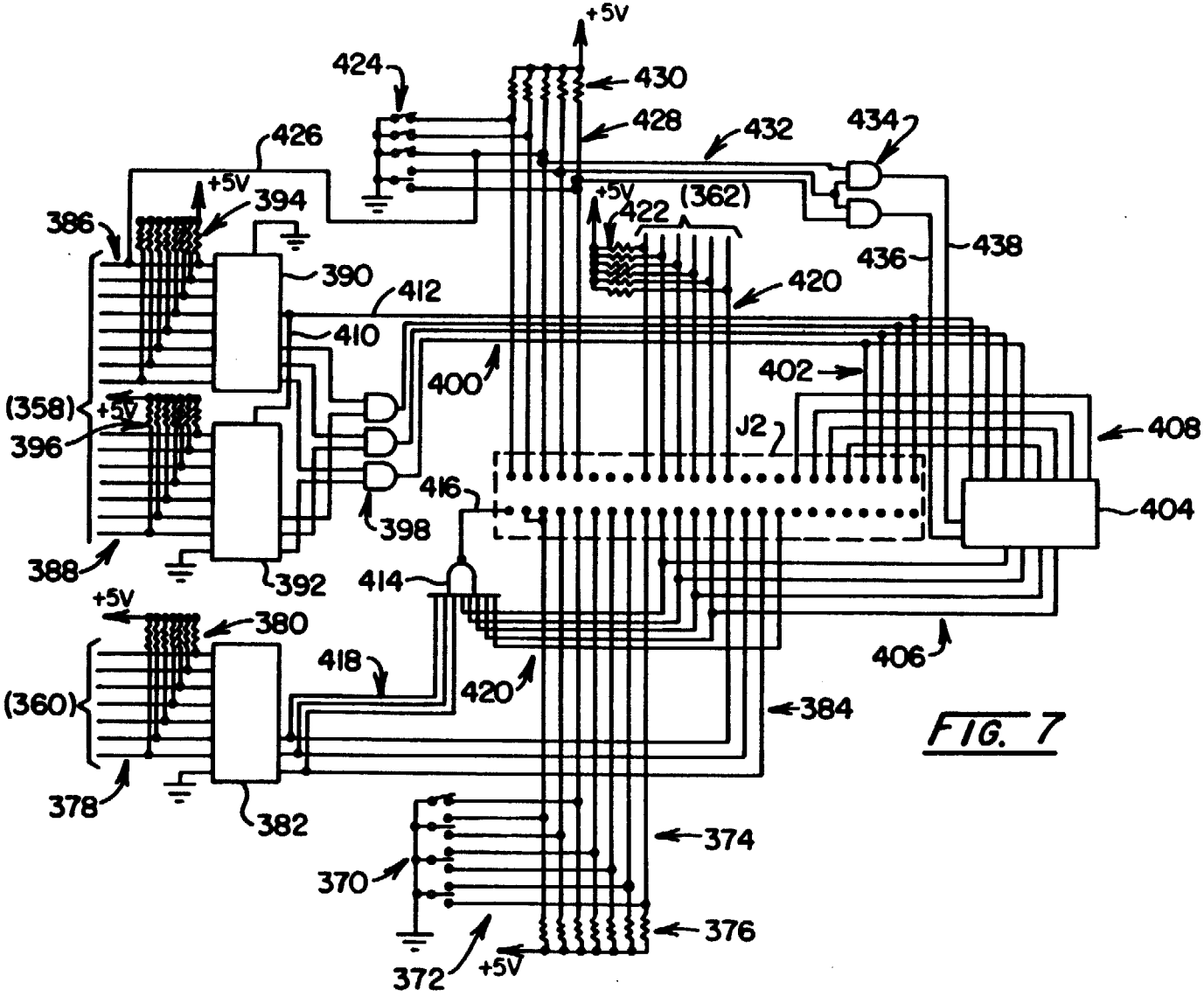
FIG. 7 is a schematic electrical diagram of a portion of the control system employed with the invention.

Referring to FIG. 7, the components of the control circuit for the system of the invention wherein switch inputs are compiled are set forth in schematic fashion. In particular, the switching information ultimately is directed to a multi-pin connector represented in the drawing within a dashed boundary J2. A four switch array represented generally at 370 serves to input signals representing, respectively from the top of the array bed down fast is developed from switch 348; bed up; bed down normal or slowly as developed from switch 346; plow up; plow down as developed from switch 350; and plow left and plow right as developed from switch 352. These inputs extend through lead array 372 to corresponding lead array 374 and thence to inputs at junction J2. An array of pull-up resistors 376 is coupled to +5 v supply, logic low signal representing an active condition. An array of leads 378 each line of which is connected to a pull-up resistor from array 380 to +5 v carries signals from the selection made at spinner speed switch 360. These inputs are provided to an eight-line to three-line binary encoder which may be provided, for example, as a type 74148. The output of device 382 at three-line array 384 is directed to inputs of connector J2. In similar fashion, the multiple outputs of the manual auger speed selection switch 358 are directed through two lead arrays 386 and 388 to the respective inputs of eight-line to three-line binary encoders 390 and 392. As before, the leads of array 386 are coupled through discrete pull-up resistors to +5 v supply as represented at resistor array 394 while, correspondingly, a similar pull-up resistor array for lead array 388 is provided at 396. The outputs of devices 390 and 392 are directed through AND gate derived combinational logic as represented at 398 to provide a three-line output a line array 400 which is directed via array 402 to connector J2 as well as to the input of a quad two-line to one-line multiplexer 404. The output of multiplexer 404 is seen to be provided at four-line array 406 which is directed to inputs to connector J2. Four additional inputs to multiplexer 404 emanate from line array 408 extending from connections at connector J2. The respective enable not in and enable out terminals of encoders 390 and 392 are additionally coupled to one input of multiplexer 404 via lines 410 and 412.

A NAND logic is developed at gate 414 for the purposes of asserting a signal calling for active mode (fluid pressure) operation of the pump 52 via line 416. The input of gate 414 receives logic input from three-line array 384 via arrays 418 and 420. Inputs from the status switch 362 are provided to connector J2 via line array 420; the leads of which are coupled through discrete pull-up resistors to +5 v as at resistor array 422.

Finally, switch array 424 is configured to receive an error input functioning to provide a menu program at display 342 for trouble-shooting purposes. Additionally within array 424 is a calibrate switch providing for the inputting of application data. This switch is the key actuated switch 366 used by management. Additionally, a blast input from switch 354 is received. This same switch input also draws the initial lead of array 386 to a logic low via line 426 to cause the auger motor to operate at maximum speed. Finally, the manual and auto selection switch 356 input is provided within array 424. Array 424 is coupled, in turn, to line array 428 which, in turn, is connected through corresponding pull-up resistors of array 430 to +5 v and to connector J2. The manual-auto information as well as blast information further is directed via three-line array 432 to AND gate logic at gate array 434, thence via lines 436 and 438 to the select and output control ports of multiplexer 404.

Figure 8:
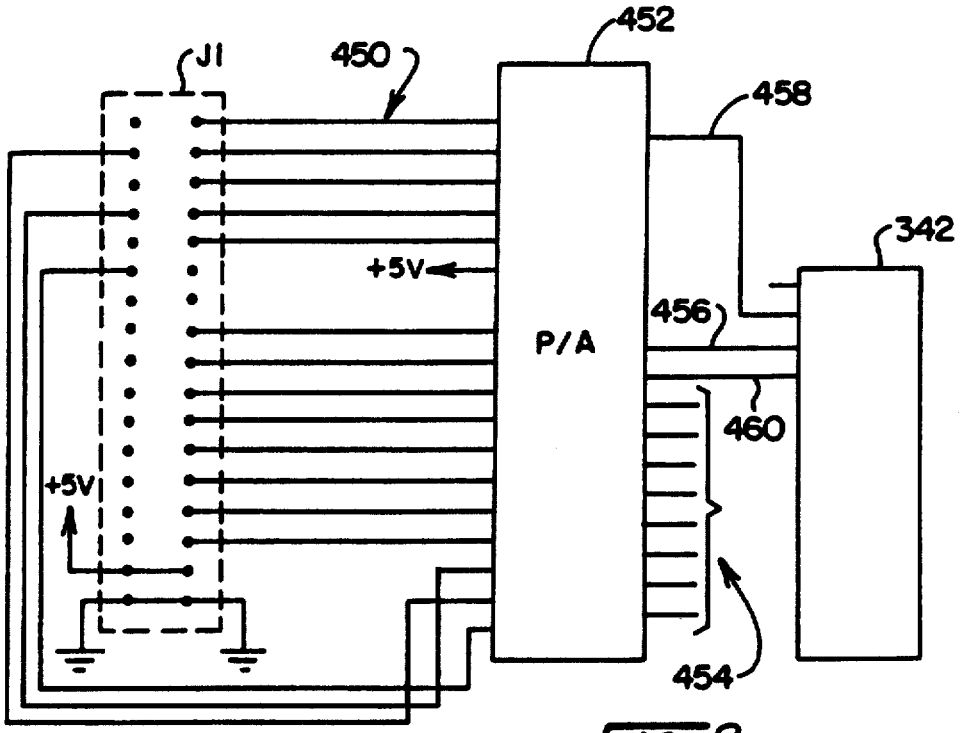
FIG. 8 is an electrical schematic diagram of another component of the control system of the invention.

Referring to FIG. 8, the arrangement for deriving the LCD display 342 is revealed. In this regard, another connector represented within dashed boundary J1 is provided which performs through the line array represented at 450 with a type 65C22 peripheral interface adapter (PIA) 452. Adapter 452 is one of four such devices provided in the circuit and may be selected, for example, as a type W65C22 marketed by The Western Design Center, Inc., Mesa, Arizona 85203. Adapter 452, in turn, through line array 454 provides the data inputs D0–D7, while the read/write terminal is driven from line 456; the enable terminal from line 458 and the RS terminal is driven from line 460.

Figure 9A:
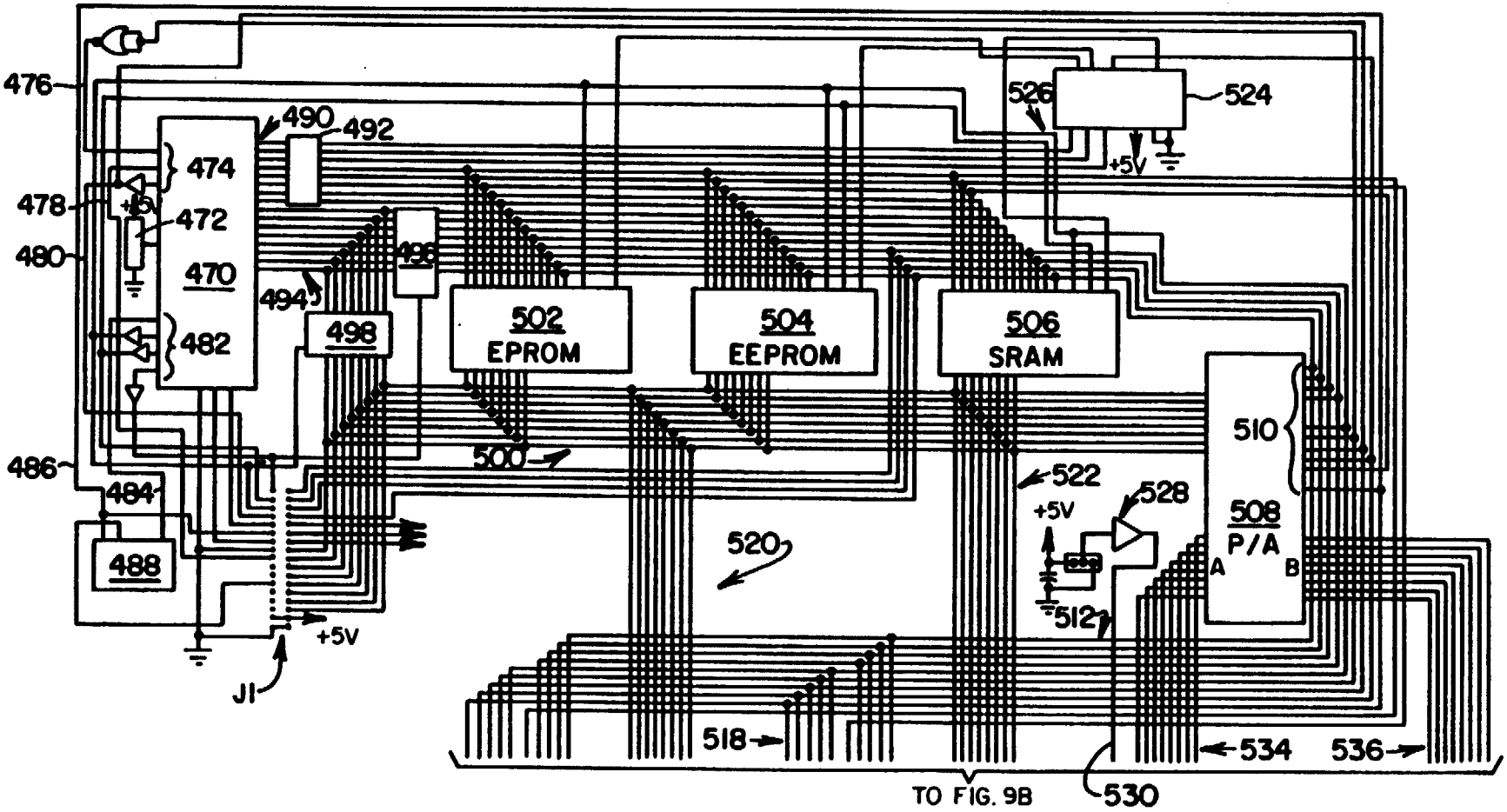
FIGS. 9A and 9B combine as labeled to show another portion of the electronic control system of the invention.
Figure 9B:
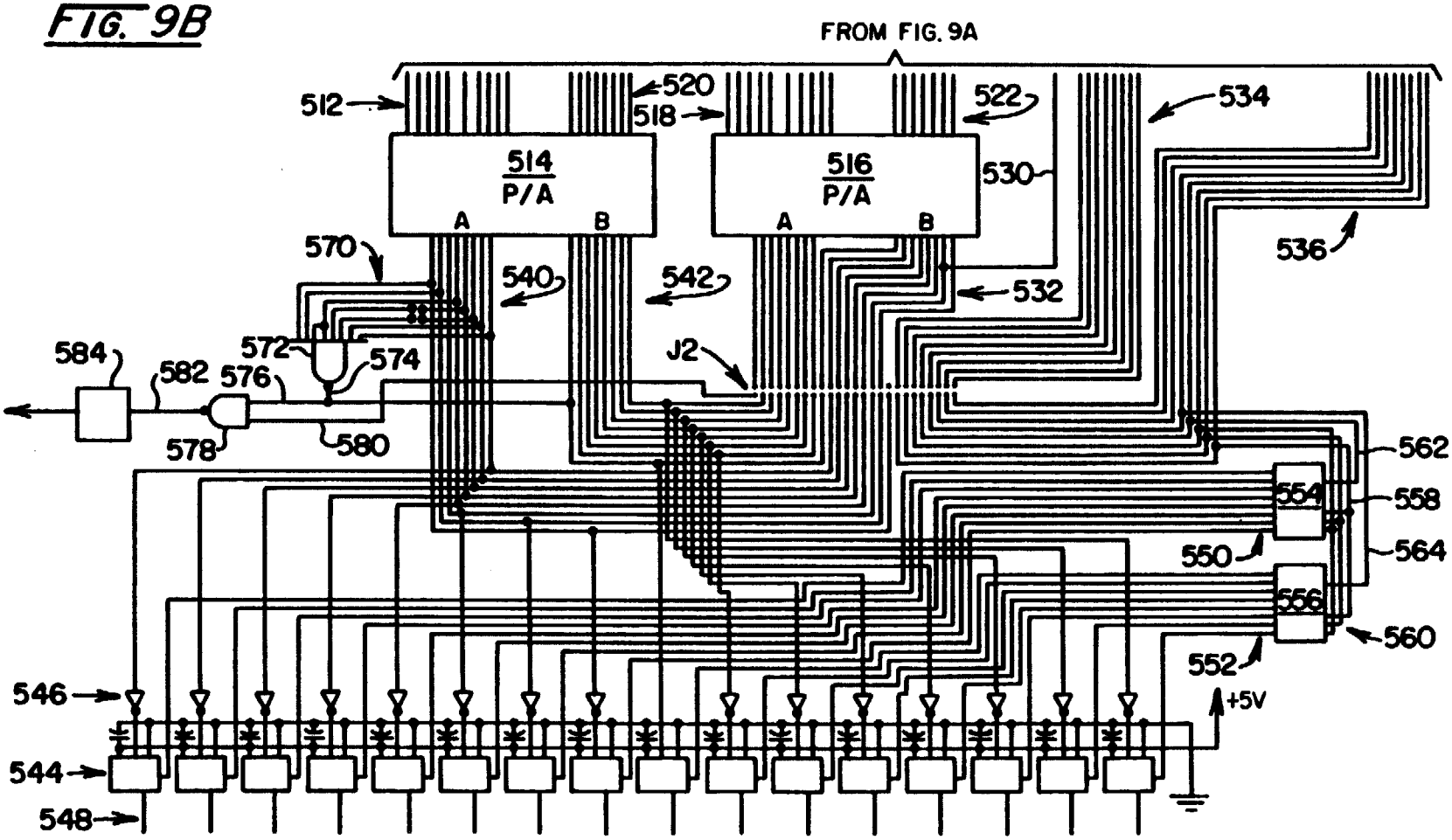

Turning now to FIGS. 9A and 9B, the logic components of the control circuit are revealed. Contained in the figures also are the corresponding connector positions for earlier-described connectors J1 and J2 which are labeled accordingly. The control circuit functions in conjunction with a type 8085 microprocessor 470 having a 1 MHz clock input at 472 and its RST6.5, RST7.5, and CLOCK OUT terminals coupled, respectively, from top to bottom with line array 474 which includes lines 476, 478, and 480. The SOD, $\overline{RD}$, $\overline{WR}$, and ALE terminals are coupled to lines at array 482, the SOD terminal being coupled via line 484 along with a line 486 extending to the reset or power up circuit 488. Device 488 also includes a watchdog input responding to the output of the SOD terminal which is coupled with line 484. The terminal provides a toggling output every 1½ seconds in order to avoid a reset function occurring. Address line array 490 is coupled to the A8–A15 terminals of microprocessor 470 and is directed to a type 74HC244 buffer 492 while the address lines AD0–AD7 within array 494 are connected to a type 74HC373 eight-bit latch 496. These leads of array 494 also are coupled to a bi-directional type 74HC245 buffer 498 whereupon they are directed to connector J1 as noted as well as to bus 500. The AD0–AD7 as well as A8–A12 terminals of microprocessor 470 additionally are coupled to a type 2764 EPROM 502 as well as to a type 2817 EEPROM 504 and to a type 6264 8 K byte RAM 506. The 0–7 terminals of components 502, 504, and 506, in turn, are coupled bus 500 which additionally is seen to extend to a type 65C22 peripheral interface adapter (PIA) 508. Terminals within the bracketed terminal region 510 of PIA 508 include in sequence from the top of the device the terminals RS0, RS1, RS2, RS3, R/W, TRO, 2, CS2, CS1, and $\overline{RESET}$. These terminals are seen to be coupled to bus 512 which extends in common to the same input terminals of an identical PIA 514 shown in FIG. 9B as well as to identical PIA 516 via connecting bus 518. PIA 514 also is coupled to bus 500 via connecting bus 520 and, in similar fashion, PIA 516 is coupled to bus 500 via connecting bus 522.

FIG. 9A also reveals a type 74138 decoder 524 controlled from microprocessor 470 via line groupling 526 which functions to provide chip select outputs for EPROM 502, EEPROM 504, RAM 506, and the four peripheral interface adapters (PIA) 508, 514, 516 and 452 (FIG. 8). Truck speed information is provided to the control system through an opto-isolator network 528 having an output at line 530 which extends to one line of line array 532 extending from port B of PIA 516. The latter line array 532 also extends to terminals of connector J2. Port A of PIA 508 is coupled to line array 534 which as seen in FIG. 9B also extends to positions within connector J2 and port B of the PIA 508 is seen to be coupled via line array 536 to the same connector position at connector component J2.

The output ports A and B of PIA component 514 are coupled via line array 540 and 542 to the actuating input of a sequence of 16 transistors represented at the array 544. These devices may be provided, for example, as type LM1951 Solid State 1 Amp Switches marketed by National SemiConductor Corporation. The active low signals derived from these ports are inverted by the inverter array 546 and the outputs of the transistors are represented at line array 548. These lines extend to the appropriate solenoid actuated valves discussed hereinabove. In the event of an error, for example, represented by an open mode or a short circuit, the affected transistor switch of array 544 will provide an error signal which is directed via line arrays 550 and 552 to the inputs of respective 8 to 1 line multiplexers 554 and 556 which may, for example, be provided as type 74HCT151. The outputs of multiplexers 554 and 556 are provided at respective lines 562 and 564. The devices are enabled from bus 536 via respective line arrays 550 and 560. Solenoid valve 82 (FIG. 3) which enables the pump 52 is actuated in response to a signal calling for the actuation of any one of the functional solenoid valves providing for truck bed movement, plow movement, auger movement, and spinner movement. These actuating signals are tapped from line array 540 by array 570 and directed to the input of an NAND gate 572. This output is directed via line 574 to line 576 to one input of NAND gate 578. The opposite input to gate 578 at line 580 emanates from connector J2 and the output of gate 578 at line 582 is directed to a transistor switching stage 584 which functions to actuate the noted enabling solenoid. Stage 584 may be provided as an above-noted type LM1951.

Figure 10:
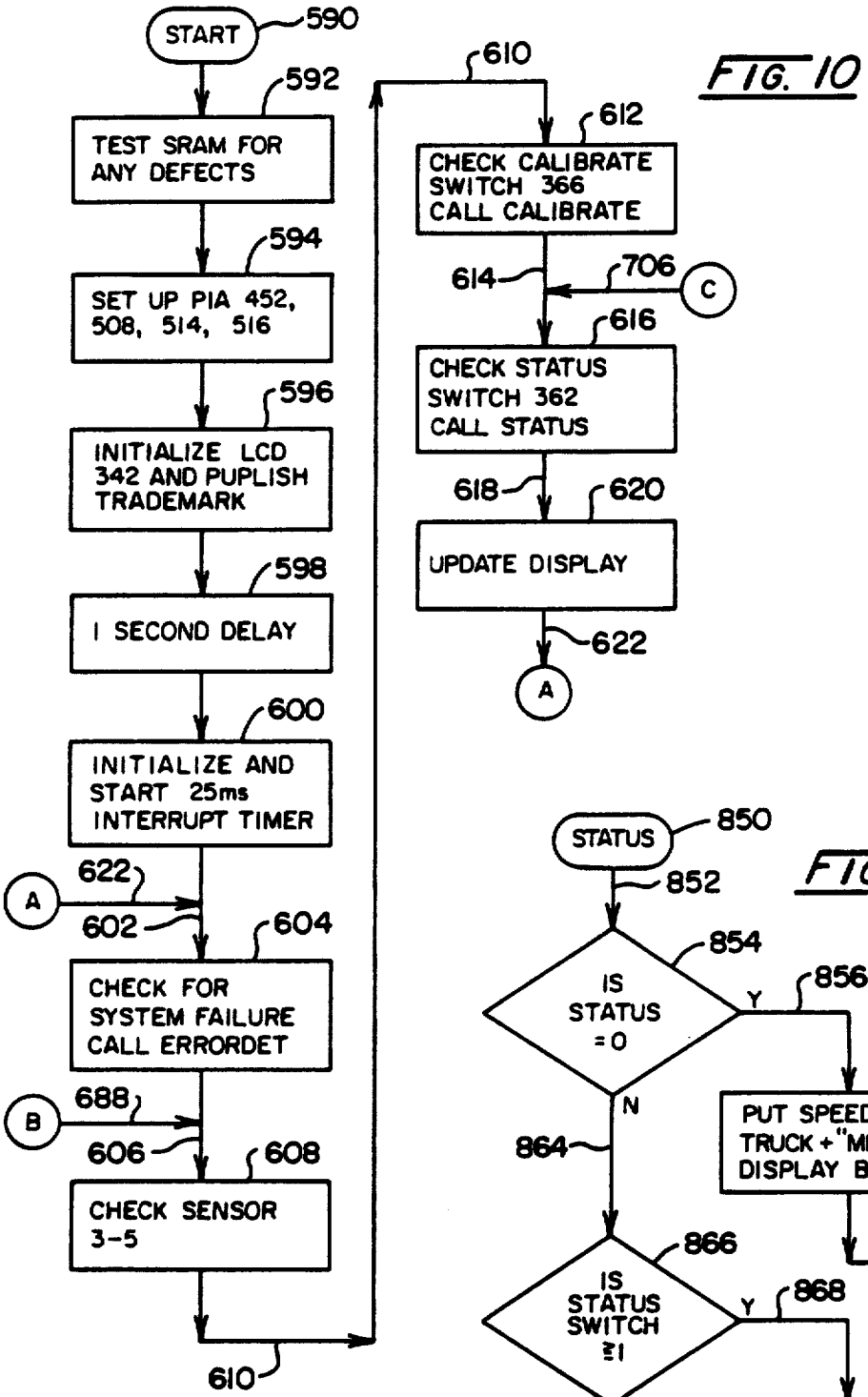
FIG. 10 is a flow chart showing the general control program employed with the invention.

Turning to FIG. 10, a flow chart representing the general control program carried out by the microprocessor function 470 is revealed. The program commences as represented at start node 590 and carries out static RAM testing as represented at block 592. Next, as represented at block 594 the peripheral interface adapters 452, 508, 574 and 516 are set-up and, as represented at block 596, the LCD display 342 is initialized and the opening trademark is published thereat. A one second delay then ensues as represented at block 598 to permit readability of the trademark at the display and, as represented at block 600, a 25 millisecond interrupt timer is initialized and started. The main program then continues as represented at line 602 and block 604 to check for any systems failure, for example the errors detected from outputs of multiplexers 554 and 556 in conjunction with FIG. 9B. Where an error is found, then a subroutine, ERRORDT is called. The program then proceeds to a sensor polling function represented at block 608. This portion of the routine permits a variety of desired sensors to be positioned, for example, about truck 10 to evaluate its operating performance. The program then continues as represented at line 610 and block 612 to determine whether or not the key actuated calibrating switch 366 has been activated. In the event that it has, then a CALIBRATE subroutine is called. As shown at line 614 and block 616, status switch 362 is checked and a STATUS subroutine is called. Line 618 and block 620 show the program then progressing to update the display 342 by calling the display subroutine. As represented at line 622 and node A, the main program then loops as represented by the coupling of line 622 with line 602.

Figure 11:
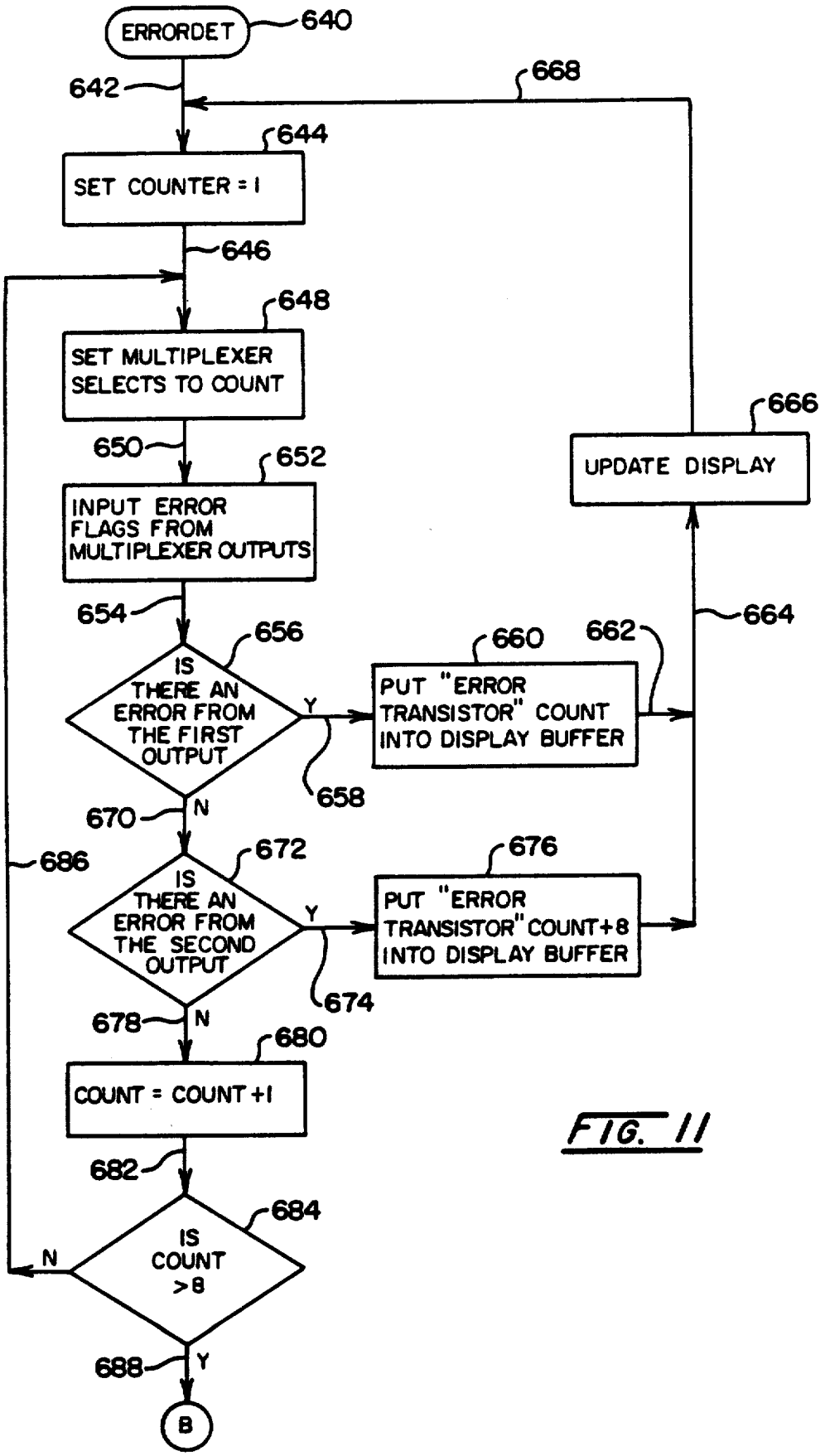
FIG. 11 is a flow chart showing a subroutine called in conjunction with the program of FIG. 10.

Turning to FIG. 11, the error detection subroutine is revealed. The error detect routine looks to the outputs of the error signal organizing multiplexers 554 and 556 described in conjunction with FIG. 9B and responding to error outputs from the transistor array 554. Thus, two components are poled in conjunction with the subroutine. As represented at block 644, a counter is set to a first count following which, as represented line 646 and block 648, the multiplexer selects are set to the count at hand. Then, as represented at line 650 and block 652 any error flags from the multiplexer outputs are inputted to the system and as represented at line 654 and decision block 656, a determination is made as to whether there is an error from the first multiplexer output. In the event there is, then as represented at line 658 and block 660, an error transistor count information is positioned within the display buffer. The routine then continues as represented at lines 662, 664 and block 666 to update the display and apprise the operator as to the location of the error. The program then loops as represented at line 668 leading to line 642.

Figures 12A, 12B:
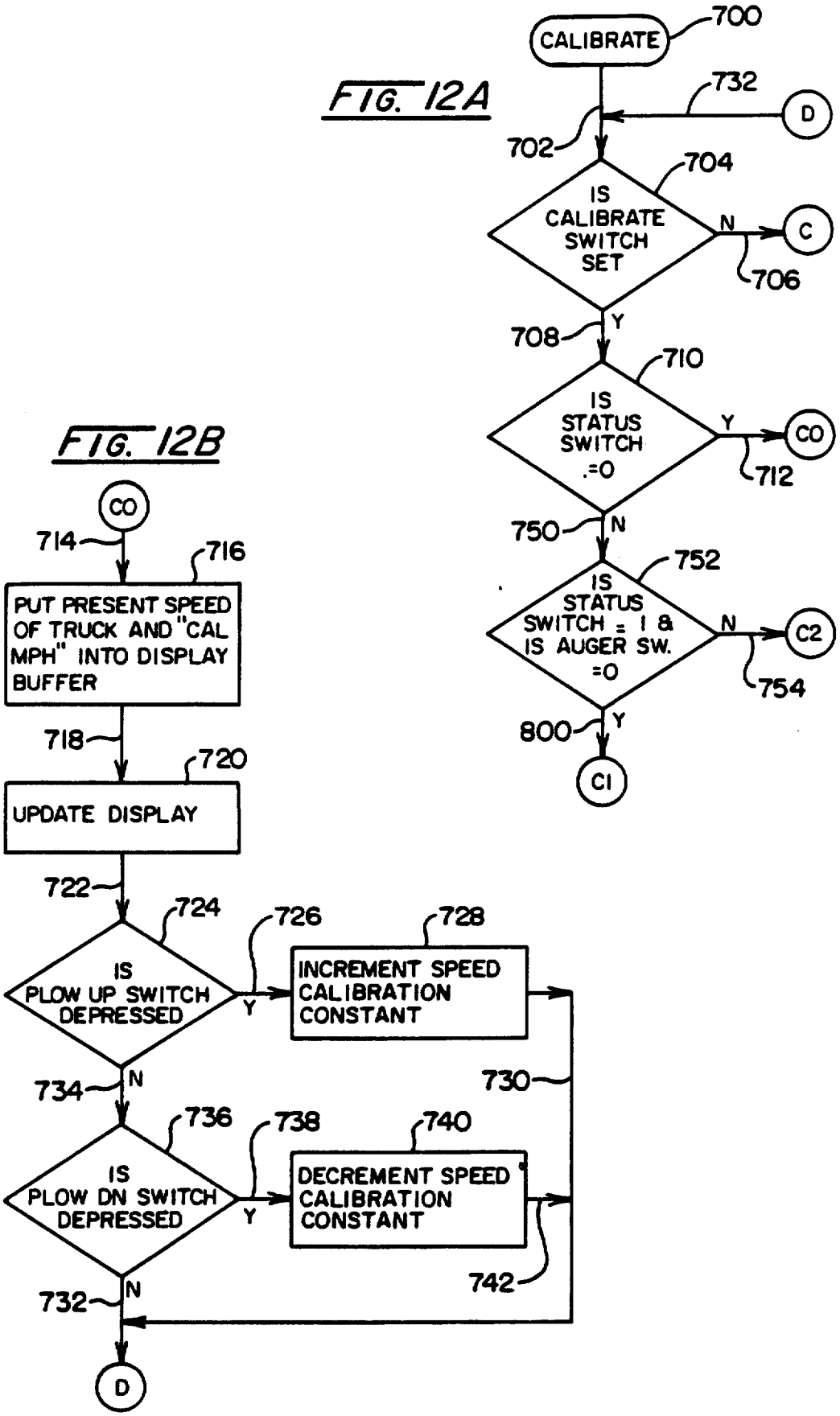
FIGS. 12A–12D are a calibrate subroutine which may be called in conjunction with the general program represented in FIG. 10.

In the event there is no error represented at the first multiplexer, then as represented at line 670 and block 672, a determination is made as to whether error information is present at the second multiplexer. In the event that it is, then as represented at line 674 and block 676, an error transistor message along with count information is placed in the display buffer. The program then progresses as represented at line 664 and block 666 to update the display with error information and a loop is completed as represented at lines 668 and 642. In the event the determination at block 670 is that there is no error present, then as represented at line 678 and block 680, the count is incremented by 1. The program then continues as represented at line 682 and block 684 to determine whether or not the count has reached a value of 8. In the event that it has not, then as represented at line 686, the routine loops to line 646 to continue. In the event that eight such counts have been developed, then as represented at line 688 and node B the subroutine returns to the main program, the latter line 688 being represented in FIG. 10.

Where the calibrate subroutine is called as described in conjunction with block 612 in FIG. 10, the control system will have been placed in a mode wherein the management has determined to set the parameters for salt/sand distribution as well as to accommodate the distribution components to individual truck vagaries. This subroutine is represented in FIGS. 12A-12D. Looking to FIG. 12A, the calibrate routine is entered at node 700 and is represented at line 702 and block 704, a determination is made as to whether the calibrate switch 366 has been set. In the event that it has not, then as represented at line 706, the routine returns as represented by node C and the same line numeration in FIG. 10. Where the determination at block 704 is in the affirmative, then a calibrate mode is at hand and as represented at line 708 and block 710, a determination is made as to whether the status switch is set at a zero value. The latter switch is represented at 364 in FIG. 6. Where a zero state is present, then a calibration with respect to miles per hour is undertaken and, as represented at line 712 and node C0, the subroutine represented in FIG. 12B is carried out. Looking to the latter figure, the routine commences as represented at line 714 and block 716, the apparent rate of speed in miles per hour which the control system considers the truck to be traveling at is placed in the display buffer. As represented at line 718 and block 720, these data then are displayed to the individual carrying out the calibration procedure. Generally, the truck will be moving at a given speed as represented by a speedometer on the highway or be operating within a speed calibrating fixture. The routine then continues as represented at line 722 and block 724 to determine whether the plow up-down switch 350 is in the up orientation. In the event that it is, then the operator is indicating that the displayed apparent speed is not equivalent to actual speed and, as represented at line 726 and block 728, this switch actuation will increment the speed calibration constant and update the displayed miles per hour. The routine then continues as represented at lines 730 and 732 to the main subroutine of FIG. 12A as represented at node B and the noted line 732. Where the inquiry at block 724 results in a negative determination, then as represented at line 734 and block 736, a determination is made as to whether the plow vertical control switch 350 is in a plow down orientation. In the event that it is, then the operator will have determined to decrement the displayed miles per hour. Accordingly, as represented at line 738 and block 740, the speed calibration constant is decremented and the results thereof are displayed. The routine then continues as represented at lines 742, 730, and 732 to return to the calibration routine. In the event of a negative determination at block 736, the same return as represented at line 730 and node D is carried out.

Returning to FIG. 12A, where the determination at block 710 is in the negative, then as represented at line 750 and block 752, a determination is made as to whether the status switch is at a logic 1 and whether the auger switch 358 is in a zero orientation. In the event of a negative determination, then as represented at lines 754 and node C2, the routine progresses to the subroutine represented in FIG. 12C. Looking to that figure, the subroutine commences as represented at line 756 and block 758 to examine the auger rotary switch 358 and obtain the auger flow rate which had been previously set therein. Such data are provided in a tabulation retained within EEPROM 504 (FIG. 9B). The subroutine then continues as represented at line 760 and block 762 wherein the auger flow rate so selected is placed in the display buffer. As represented at line 764 and block 768, the display then is updated with that information and as represented at line 768 and block 770, a determination is made as to whether the plow vertical switch 350 is in an up orientation. In the event that it is, then the calibrating individual has determined to increment an auger flow rate constant to a new value as represented by line 772 and block 774. The subroutine then returns to the basic calibrate routine as represented at lines 776 and 778 leading to node D and line 732 extending to line 702.

Where the determination at block 770 is in the negative, then as represented at line 780 and block 782, a determination as to whether the plow switch 350 is in an orientation for plow down. In the event of an affirmative determination, then as represented by line 784 and block 786, the auger flow rate constant representation is incremented and the routine returns as represented at line 788, 776, and 778. The resultant alteration of the auger flow rate constant is retained in the noted EEPROM 504.

Figure 12D:
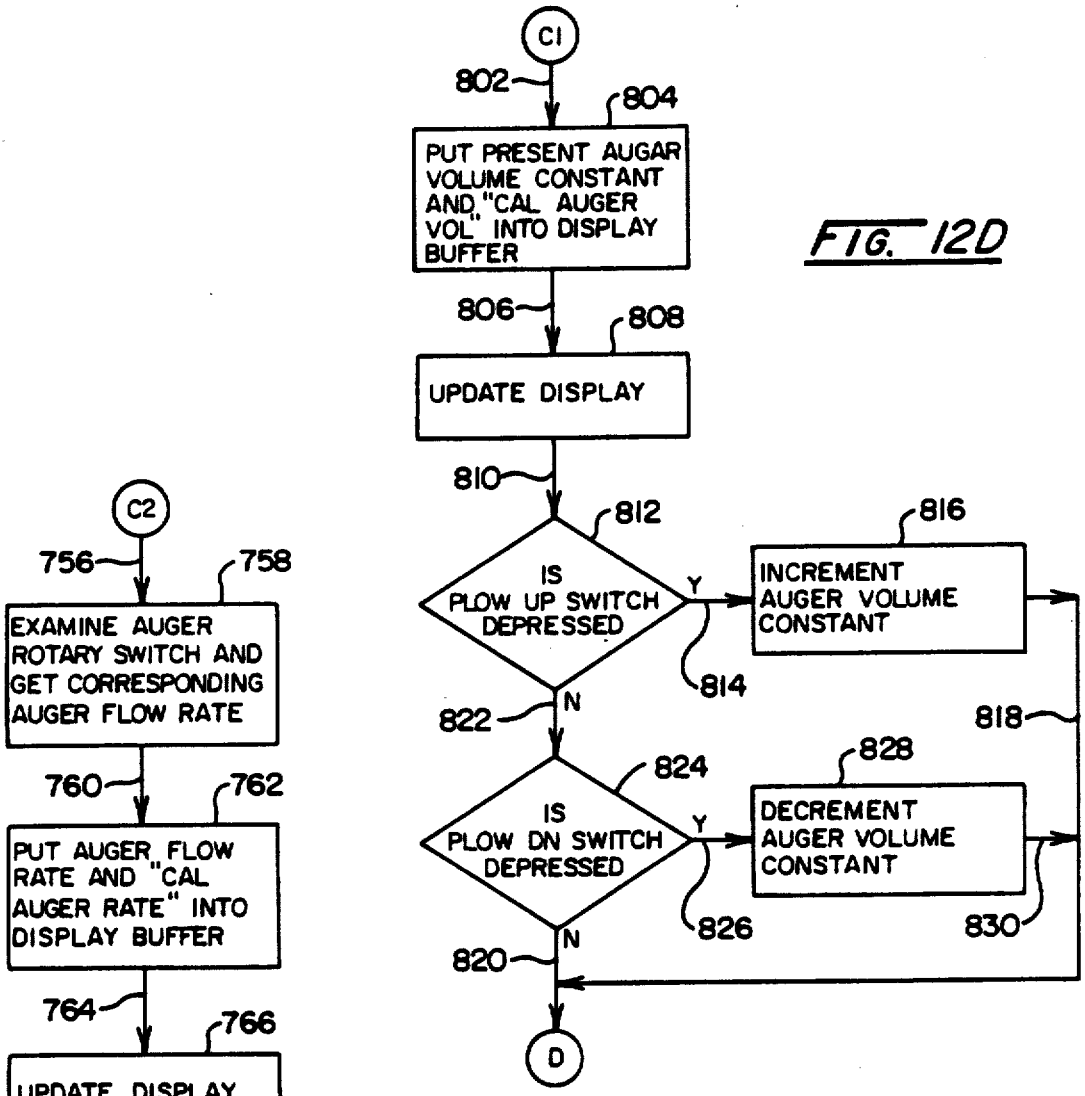
Figure 12C:
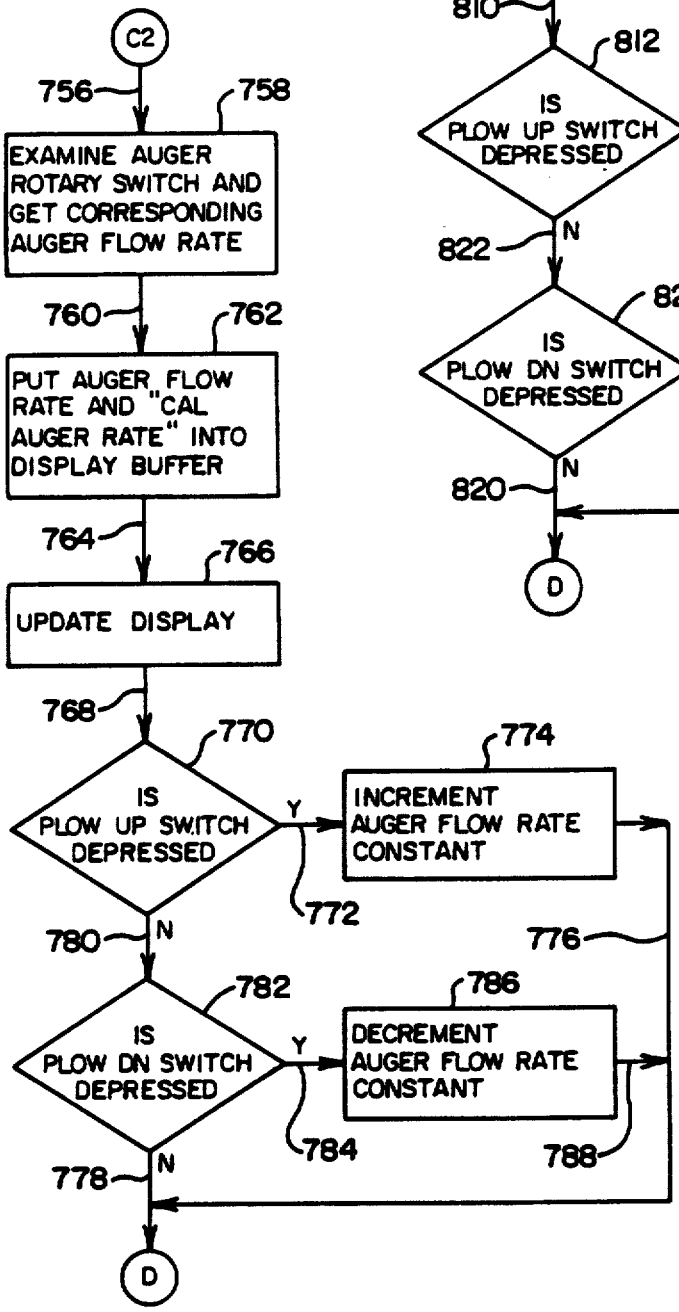

Returning to FIG. 12A, where an affirmative determination is made at block 752, then as represented at line 800 and node C1, the subroutine represented at FIG. 12D is entered. This subroutine is one wherein the material output rate developed by the auger on the truck is adjusted. Looking to FIG. 12D, the subroutine is entered as represented at node C1, line 802, and block 804. The auger volume constant is the amount of material such as salt outputted by the auger in pounds per minute at a motor flow of one gallon per minute. The constant may be either calculated or measured, the value then is placed in the display buffer and as represented at line 806 and block 808, the display is updated with that value. The subroutine then continues as represented at line 810 and block 812 to determine whether the plow vertical orientation switch 350 is in a plow up orientation. In the event that it is, then as represented by line 814 and block 816, the value displayed for the auger volume constant is incremented to the extent desired by the calibrating operator. The subroutine then returns as represented by lines 818, 820, and node D.

Where the determination at block 812 is in the negative, then as represented at line 822 and block 824 a determination is made as to whether the switch 350 is in a plow down orientation. In the event that it is, then as represented at lines 826 and block 828, the auger volume constant is decremented to an extent desired by the calibrating operator and the subroutine returns as represented by lines 830, 820, and node D.

Figure 13:
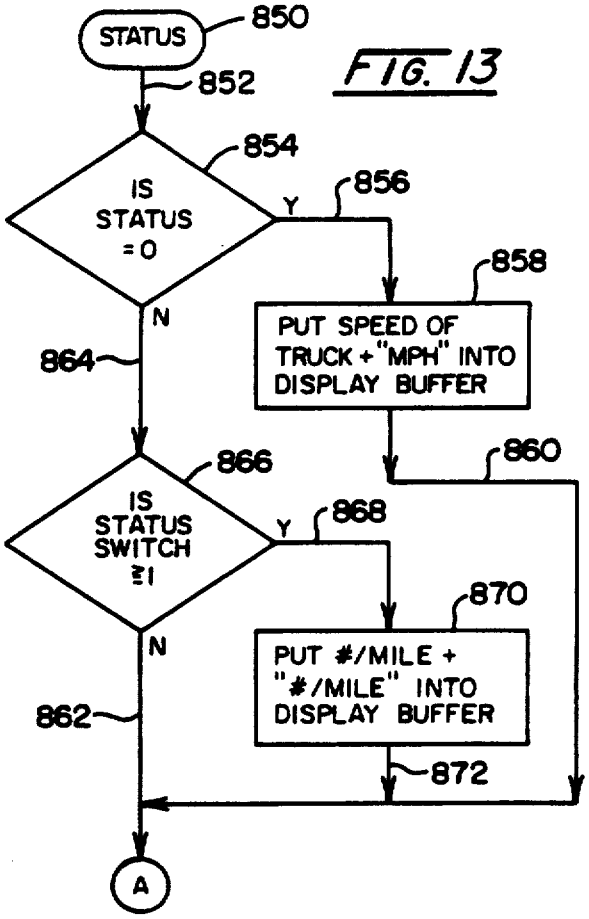
FIG. 13 is a status subroutine which may be called by the general program represented in FIG. 10.

Block 616 of the main program described in conjunction with FIG. 10 calls for a status subroutine functioning to determine the status of switch 362. Looking to FIG. 13, the status subroutine is shown entered at node 850 and line 852 leading to the inquiry at block 854. A determination is made as to whether the switch is in a select orientation here designated as zero. In the event that it is, then as represented at line 856 and block 858, the truck seed in miles per hour is positioned in the display buffer as represented in the main program block 620. The subroutine then ends as represented at lines 860 and 862. Where the determination at block 854 is in the negative, then as represented at line 864 and block 866, a determination is made as to whether the status switch is in a position equal to or greater than one. Where that is the case, then as represented at line 868 and block 870, a pounds representation of operation is placed in the display buffer for display and the subroutine returns as represented by lines 872, 860, and 862 and node A.

Since certain changes may be made in the above-described system and apparatus without departing from the scope of the invention herein involved, it is intended that all matter contained in the description thereof and shown in the accompanying drawings shall be interpreted as illustrative and not in a limiting sense.

We claim:

1. In a utility vehicle of the type having an internal combustion engine and hydraulically driven implements operated when selectively actuated, with pressurized hydraulic fluid derived from a pump driven by said engine, the improved hydraulic pump comprising:

a pump housing mounted upon said vehicle, and having a pump chamber;

first and second pump gears mounted for rotation within said housing pump chamber and defining a pump suction side and a pump pressure side connectable with said implements;

connector means for connecting said first pump gear in continuous driven relationship with said engine;

suction port means for coupling said pump suction side with a hydraulic fluid reservoir retained at substantially atmospheric pressure;

a poppet valve coupled intermediate said suction port means and said pump suction side and actuable to have a closed orientation substantially blocking passage of said hydraulic fluid into said suction side to derive a cavitation mode of pump operation and actuable to have an open orientation permitting the flow of hydraulic fluid from said reservoir into said pump suction side to derive a fluid pressurizing mode of operation, said poppet valve including a poppet slidably movable between open and closed orientations within a valve chamber;

vent means for venting said pump chamber substantially to atmospheric pressure to avoid ingress of air thereinto during said cavitation mode of pump operation; and actuator means for selectively actuating said poppet valve into said open orientation by coupling one end of said valve chamber with said pump suction side, and into said closed orientation by terminating said coupling with said suction side to permit movement of said poppet to said closed orientation.

2. The hydraulic pump of claim 1 including lubricating duct means coupled intermediate said reservoir and said pump suction side for effecting the flow of hydraulic fluid from said reservoir to said chamber sufficient only to effect adequate lubrication of said first and second gears during said cavitation mode of operation; and a fluid return line having a check valve, said return line aiding the movement of said poppet to said closed orientation upon said actuator means actuation of said poppet valve during said fluid pressurization mode.

3. The hydraulic pump of claim 2 in which:

said valve means comprises a poppet valve including a poppet movable between open and closed orientations within a valve chamber; and said actuator means effects said actuation of said valve means into said open orientation by coupling said valve chamber with said pump suction side.

4. The hydraulic pump of claim 1 in which said vent means includes a passageway extending through said second pump gear and communicating with said reservoir.

5. The hydraulic pump of claim 1 including lubricating duct means coupled intermediate said reservoir and said pump suction side for effecting the flow of hydraulic fluid from said reservoir to said chamber sufficient only to effect adequate lubrication of said first and second gears during said cavitation mode of operation and provide vacuum retention of said poppet at said closed orientation from said suction side.

6. The hydraulic pump of claim 5 including a fluid return line having check valve means for returning hydraulic fluid from said pump pressure side said cavitation mode of operation to said valve chamber one end to effect movement of said poppet to said closed orientation and device.

7. The hydraulic pump of claim 1 in which said actuator means is a solenoid actuated valve responsive to a said select actuation of a said hydraulically driven implement to actuate said valve means into said open orientation.

8. The hydraulic pump of claim 5 in which said vent means includes a passageway extending through said second pump gear and communicating with said reservoir.

9. In a truck of a variety having an internal combustion engine serving as a prime mover, a hydraulic pump driven by said engine, a dump bed and a hydraulic cylinder assembly including a rod and piston reciprocally movable within a cylinder chamber between first and second positions for selectively elevating and lowering said dump bed, the improved hydraulic control system comprising:

a hydraulic distribution network including a pressure line extending from said pump, a suction line extending from said pump, and a reservoir substantially at atmospheric pressure communicating with said suction line;

first hydraulic valve means hydraulically actuable to apply hydraulic fluid from said pressure line to said cylinder chamber at said first position and simultaneously fluid communicate said reservoir with said chamber second position to effect said bed elevation;

second hydraulic valve means hydraulically actuable to apply hydraulic fluid from said pressure line to said cylinder chamber at said second position and simultaneously fluid communicate said reservoir with said chamber first position to effect said bed lowering;

third hydraulic valve means hydraulically actuable to communicate said reservoir with said chamber first position to effect a rapid bed lowering movement;

first switch controlled actuator means for actuating said first hydraulic valve means;

second switch controlled actuator means for actuating said second hydraulic valve means;

third switch controlled actuator means for actuating said third hydraulic valve means;

control means controllably coupled with said first, second, and third switch controlled actuator means, including first switch means manually actuable for controlling said first and second switch controlled actuator means and second switch means manually actuable for controlling said third switch controlled actuator means for effecting a rapid lowering movement of said bed of short duration.

10. The improved hydraulic control system of claim 9 in which said second switch means is a button switch biased to an open orientation.

11. The improved hydraulic control system of claim 9 in which said first, second, and third switch controlled hydraulic valve means are solenoid actuated valves.

12. The improved hydraulic control system of claim 9 including hydraulically actuated pressure compensating valve means coupled with said second hydraulic valve means for regulating said fluid communication with said reservoir to effect said bed lowering at a substantially constant rate.

13. In a truck of a variety suited for snow-ice control wherein a wheel mounted frame supports an internal combustion engine, a cab and a hydraulic cylinder driven dump bed, and including an auger mounted rearwardly of said bed having a hydraulic auger motor and a hydraulic motor driven spinner for receiving materials deposited thereon at predetermined rates by said auger, the improved control system comprising:

a hydraulic pump connected in driven relationship with said engine for powering said auger and spinner hydraulic motors and said hydraulic cylinder;

solenoid actuated valve means selectively actuable for controlling the speed of said auger motor;

speed transducer means having a speed output which when multiplied by a speed calibration constant derives a product signal representing truck speed;

electronically erasable memory means for retaining said speed calibration constant, in auger volume constant and auger flow rate constants;

control means including calibration switch means actuable under management limited access for deriving a calibration mode, processor means for controllably effecting actuation of said solenoid actuated valve means in correspondence with said speed product signal, said memory retained speed calibration constant, said auger volume constant and said auger flow rate constants, and responsive to said calibration switch means actuation to enter said calibration mode to effect select alteration of said memory retained constants.

14. The improved control system of claim 13 in which said memory means and said control means are mounted within said truck cab.

15. In a truck of a variety having an internal combustion engine, a hydraulic pump driven by said engine, a dump bed and a hydraulic cylinder assembly including a rod and piston reciprocally movable within a cylinder chamber for selectively elevating and lowering said dump bed, the improved hydraulic control system comprising:

a hydraulic distribution network including a pressure line extending from said pump, a suction line extending from said pump, and a reservoir substantially at atmospheric pressure communicating with said suction line;

first hydraulic valve means hydraulically actuable to apply hydraulic fluid from said pressure line to said cylinder chamber to effect said bed elevation;

second hydraulic valve means hydraulically actuable to fluid communicate said reservoir with said chamber to effect said bed lowering;

third hydraulic valve means hydraulically actuable to communicate said reservoir with said chamber to effect a rapid bed lowering movement;

first switch controlled actuator means for actuating said first hydraulic valve means;

second switch controlled actuator means for actuating said second hydraulic valve means;

third switch controlled actuator means for actuating said third hydraulic valve means;

control means controllably coupled with said first, second, and third switch controlled actuator means, including first switch means manually actuable for controlling said first and second switch controlled actuator means and second switch means manually actuable for controlling said third switch controlled actuator means for effecting a rapid lowering movement of said bed of short duration.

16. The improved hydraulic control system of claim 15 in which said second switch means is a button switch biased to an open orientation.

17. The improved hydraulic control system of claim 15 in which said first, second, and third switch controlled hydraulic valve means are solenoid actuated valves.

18. The improved hydraulic control system of claim 15 including hydraulically actuated pressure compensating valve means coupled with said second hydraulic valve means for regulating said fluid communication with said reservoir to effect said bed lowering at a substantially constant rate.

*19. In a truck of a variety suited for snow-ice control wherein a wheel mounted frame supports an internal combustion engine, a cab and a dump bed, and including an auger mounted rearwardly of said bed having a hydraulic auger motor and a spinner having a hydraulic spinner motor for receiving materials deposited thereon at predetermined rates by said auger, the improved control system comprising:*

*a hydraulic pump connected in driven relationship with said engine for supplying hydraulic fluid under pressure for powering said hydraulic auger and spinner motors and having a pump output line;*

*a first array of solenoid actuated valves hydraulically parallel coupled, from first to last, having a first common array input coupled with said pump output line, and selectively actuable to establish a select hydraulic flow rate at a first common array output for controlling the speed of said auger motor;*

*a first valve coupled with said pump output line and said first array of solenoid actuated valves and responsive to monitor the pressures at said first common array input and output and effect pressure control thereacross; and*

*control means responsive to a first manually derived select input for effecting said actuation of select said first to last valves of said first array of solenoid actuated valves.*

*20. The improved control system of claim 19 in which each said solenoid actuated valve of said first array is configured, from first to last, having a flow rate increasing in binary designated flow rate increments.*

*21. The improved control system of claim 19 including: a second array of solenoid actuated valves hydraulically parallel coupled, from first to last, having a second common array input coupled with said pump output line, and selectively actuable to establish a select hydraulic flow rate at a second common output for controlling the speed of said spinner motor; a second valve coupled with said pump output line and said second array of solenoid actuated valves and responsive to monitor the pressures at said second common array input and output and effect pressure control thereacross; and said control means is responsive to a second manually derived select input for effecting actuation of said second array of solenoid actuated valves.*

*22. The improved control system of claim 21 in which each said solenoid actuated valve of said second array is configured, from first to last, having a flow rate increasing in binary designated flow rate increments.*

*23. In a truck of a variety suited for snow-ice control wherein a wheel mounted frame supports an internal combustion engine, a cab and a dump bed, and including an auger mounted rearwardly of said bed having a hydraulic auger motor and a spinner having a hydraulic spinner motor for receiving materials deposited thereon at predetermined rates by said auger, the improved control system comprising:*

*a hydraulic pump connected in driven relationship with said engine and having a pump output line for supplying hydraulic fluid under pressure for powering said hydraulic spinner motor;*

*an array of solenoid actuated valves hydraulically parallel coupled, from first to last, having a common array input coupled with said pump output line, and selectively actuable to establish a select hydraulic flow rate at a common output for controlling the speed of said spinner motor;*

*a valve coupled with said pump output line and said array of solenoid actuated valves and responsive to monitor the pressure at said common array input and output and effect pressure control thereacross; and*

*control means responsive to a first manually derived select input for effecting said actuation of select said first to last valves of said first array of solenoid actuated valves.*

*24. The improved control system of claim 23 in which each said solenoid actuated valve of said array, from first to last, is configured having a flow rate increasing in binary designated flow rate increments.*

*25. The improved control system of claim 13 in which said solenoid actuated valve means is comprised of an array of hydraulically parallel coupled valves, each said valve of said array, from first to last, being configured having a flow rate increasing in binary designated flow rate increments.*

* * * * *